US012652275B2

(12) United States Patent
Hou et al.

(10) Patent No.: US 12,652,275 B2
(45) Date of Patent: Jun. 9, 2026

(54) SECURE PACKET SENDING METHOD WITH PARTIALLY ENCRYPTED SEGMENT ROUTING HEADER IN IPV6 NETWORK

(71) Applicant: HUAWEI TECHNOLOGIES CO., LTD., Shenzhen (CN)

(72) Inventors: Jianqiang Hou, Zürich (CH); Hongwei He, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 18/589,743

(22) Filed: Feb. 28, 2024

(65) Prior Publication Data

US 2024/0205205 A1 Jun. 20, 2024

Related U.S. Application Data

(63) Continuation of application No. PCT/CN2022/114821, filed on Aug. 25, 2022.

(30) Foreign Application Priority Data

Aug. 31, 2021 (CN) .......................... 202111013733.5
Nov. 3, 2021 (CN) .......................... 202111295472.0

(51) Int. Cl.
*H04L 9/40* (2022.01)
*H04L 45/00* (2022.01)
*H04L 45/741* (2022.01)

(52) U.S. Cl.
CPC .......... *H04L 63/0485* (2013.01); *H04L 45/34* (2013.01); *H04L 45/741* (2013.01)

(58) Field of Classification Search
CPC ... H04L 63/0485; H04L 45/34; H04L 45/741; H04L 45/74
See application file for complete search history.

(56) References Cited

U.S. PATENT DOCUMENTS 9,762,488 B2 * 9/2017 Previdi .................. H04L 69/22
11,019,075 B2 * 5/2021 Filsfils ............... H04L 63/0485
(Continued)

FOREIGN PATENT DOCUMENTS

CN    112615878 A    4/2021
CN    113141339 A    7/2021

OTHER PUBLICATIONS

Filsfils, C., et al. "RFC 8754: IPV6 Segment Routing Header (SRH)." IETF (Mar. 2020) (2020): 1-27.*
(Continued)

*Primary Examiner* — Jimmy H Tran
(74) *Attorney, Agent, or Firm* — WOMBLE BOND DICKINSON (US) LLP

(57) ABSTRACT

A packet sending method, a network device, and a program product are disclosed, and pertain to the field of segment routing technologies. The method includes: A network device sends a packet which includes a segment routing header SRH and a payload, the SRH includes an encrypted field and an unencrypted field, the encrypted field includes at least an encrypted SID list, and the SID list indicates a transmission path of the packet. A SID list in an SRH of an SRv6 packet transmitted over a POP network is encrypted, thereby protecting SID information from being leaked. In addition, an intermediate node on a packet transmission path only needs to decrypt an encrypted field in the SRH to determine a next hop from the SID list, and does not need to decrypt the payload. This improves forwarding efficiency of the network device and protects secure transmission of the payload.

20 Claims, 14 Drawing Sheets

(56) References Cited

U.S. PATENT DOCUMENTS

| | | | | |
|---|---|---|---|---|
| 11,895,020 | B1 * | 2/2024 | Arham | H04L 45/28 |
| 12,155,569 | B1 * | 11/2024 | Cirkovic | H04L 45/66 |
| 2017/0026417 | A1 * | 1/2017 | Ermagan | H04L 63/0428 |
| 2019/0327738 | A1 * | 10/2019 | Torres | H04W 24/02 |
| 2019/0394211 | A1 * | 12/2019 | Filsfils | H04L 63/12 |
| 2021/0359942 | A1 * | 11/2021 | Previdi | H04L 69/166 |
| 2022/0279421 | A1 * | 9/2022 | Sivakumar | H04L 45/586 |
| 2023/0024980 | A1 * | 1/2023 | Li | H04L 45/50 |
| 2023/0079209 | A1 * | 3/2023 | Nallamothu | H04L 12/4641 |
| | | | | 709/238 |
| 2023/0102984 | A1 * | 3/2023 | Lu | H04L 63/164 |
| | | | | 726/11 |
| 2023/0133720 | A1 * | 5/2023 | Bidgoli | H04L 45/66 |
| | | | | 709/238 |
| 2023/0388223 | A1 * | 11/2023 | Hu | H04L 45/50 |
| 2023/0412526 | A1 * | 12/2023 | Nallamothu | H04L 45/50 |
| 2024/0031908 | A1 * | 1/2024 | Grewal | H04L 45/741 |
| 2024/0106740 | A1 * | 3/2024 | Chang | H04L 63/12 |
| 2024/0422107 | A1 * | 12/2024 | Sharma | H04L 41/0806 |
| 2025/0071046 | A1 * | 2/2025 | Chen | H04L 63/14 |
| 2025/0097821 | A1 * | 3/2025 | Akkipeddi | H04L 45/04 |
| 2025/0193296 | A1 * | 6/2025 | Fan | H04L 69/164 |

OTHER PUBLICATIONS

Leddy, J., et al. "Rfc 8986: Segment routing over ipv6 (srv6) network programming." (2021).*

C.Filsfils,Ed.et al,"IPv6 Segment Routing Header (SRH)", Internet Engineering Task Force (IETF),Request for Comments:8754,Mar. 2020,total 17 pages.

U.Herberg,et al, "Integrity Check Value and Timestamp TLV Definitions for Mobile Ad Hoc Networks (MANETs) draft-herberg-manet-rfc6622-bis-00", Mobile Ad hoc Networking (MANET), Internet-Draft Obsoletes:6622 (if approved),Feb. 18, 2013,XP015090132,total 21 pages.

* cited by examiner

| Version (Version) | Traffic class (Traffic Class) | Flow label (Flow Label) | |
|---|---|---|---|
| Payload length (Payload Length) | | Next header (Next=43) | Hop limit (Hop Limit) |
| Source address (Source Address) | | | |
| Destination address (Destination Address) | | | |

IPv6 header

| Next header (Next Header) | SRH length (Hdr Ext Len) | Routing type (Routing Type) | Segment left (Segment Left) |
|---|---|---|---|
| Index of the last element (Last Entry) | Flags of a data packet (Flags) | Data packets in a same group (Tag) | |
| Segment List [0] | | | |
| Segment List [1] | | | |
| ... | | | |
| Segment List [n] | | | |
| One or more TLVs | | | |

SRH

FIG. 5

First device                                             Second device

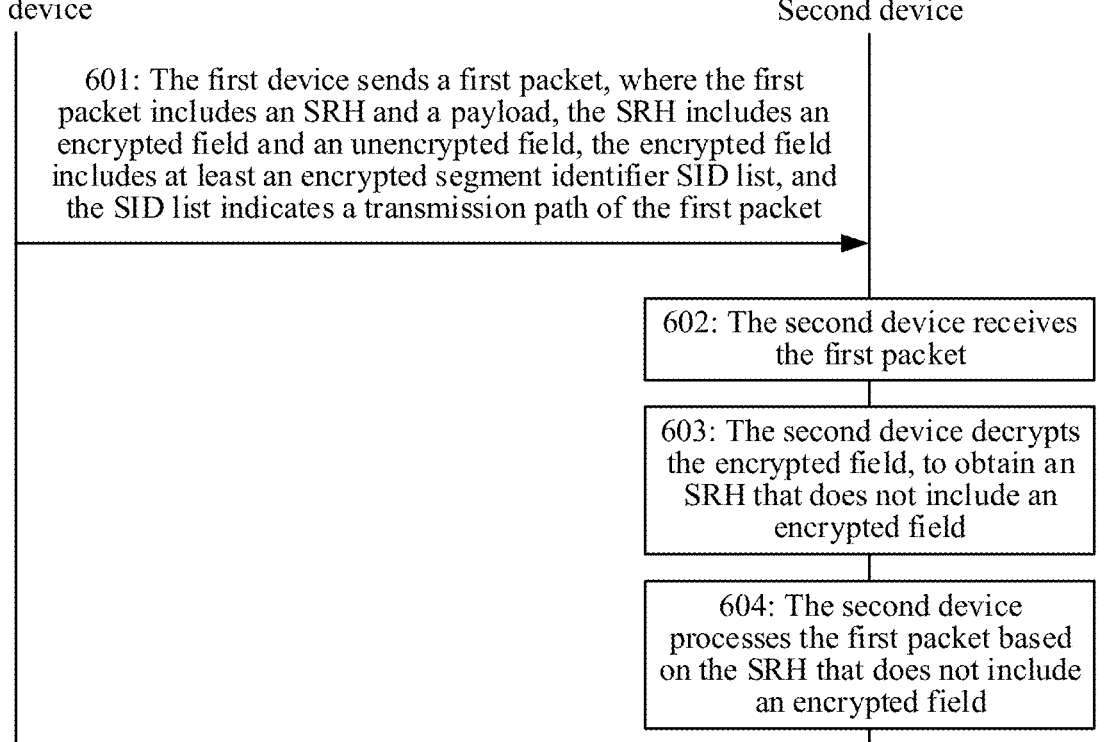

601: The first device sends a first packet, where the first packet includes an SRH and a payload, the SRH includes an encrypted field and an unencrypted field, the encrypted field includes at least an encrypted segment identifier SID list, and the SID list indicates a transmission path of the first packet 602: The second device receives the first packet 603: The second device decrypts the encrypted field, to obtain an SRH that does not include an encrypted field 604: The second device processes the first packet based on the SRH that does not include an encrypted field

CONT. FROM

First device                                                    Second device

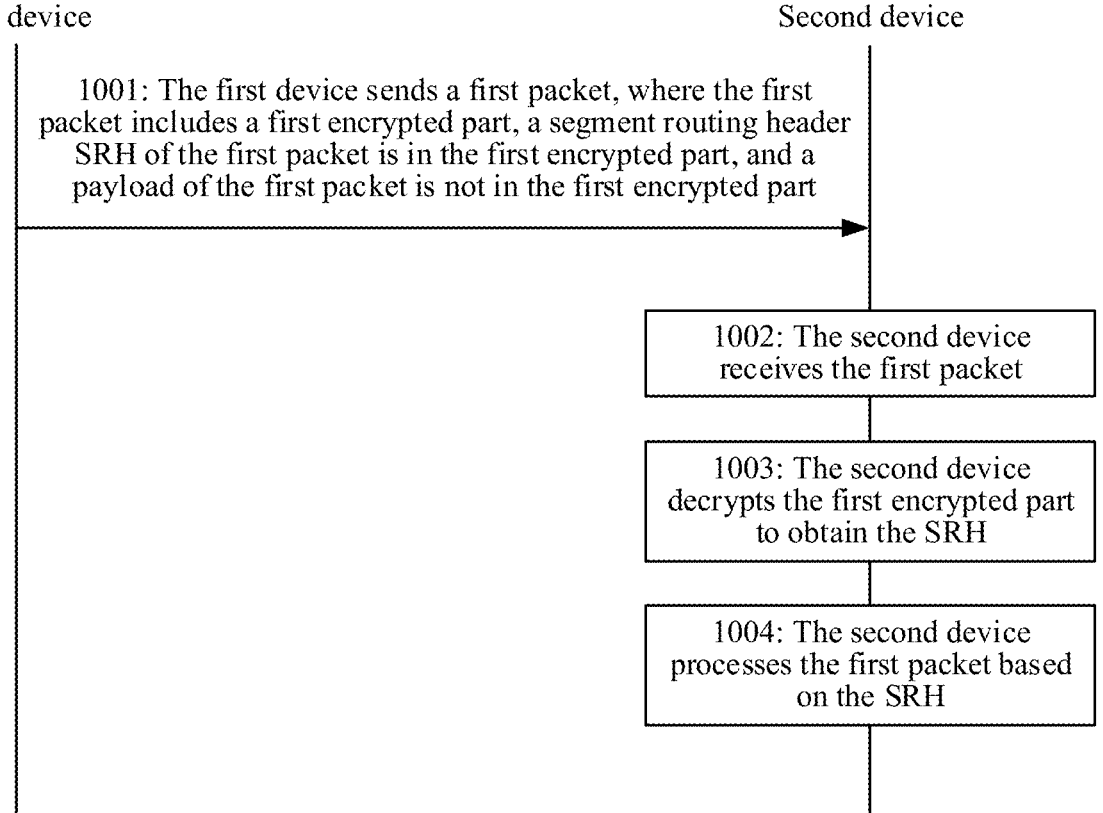

1001: The first device sends a first packet, where the first packet includes a first encrypted part, a segment routing header SRH of the first packet is in the first encrypted part, and a payload of the first packet is not in the first encrypted part 1002: The second device receives the first packet 1003: The second device decrypts the first encrypted part to obtain the SRH 1004: The second device processes the first packet based on the SRH

FIG. 10

SECURE PACKET SENDING METHOD WITH PARTIALLY ENCRYPTED SEGMENT ROUTING HEADER IN IPV6 NETWORK

CROSS-REFERENCE TO RELATED APPLICATIONS

This application is a continuation of International Application No. PCT/CN2022/114821, filed on Aug. 25, 2022, which claims priorities to Chinese Patent Application No. 202111013733.5, filed on Aug. 31, 2021 and Chinese Patent Application No. 202111295472.0, filed on Nov. 3, 2021. All of the aforementioned applications are hereby incorporated by reference in their entireties.

TECHNICAL FIELD

Embodiments of this application relate to the field of segment routing technologies, and in particular, to a packet sending method, a network device, a storage medium, and a program product.

BACKGROUND

A point of presence (POP) network is a network architecture based on a software-defined wide area network (SD-WAN) technology. Through the POP network, an enterprise branch site can connect to a nearest POP point in the POP network by using a local internet line, and then cross-region mutual service access is implemented through POP points in the POP network, thereby meeting requirements of services such as enterprise networking, cloud access, and internet access. During forwarding of service data in the POP network, privacy of the service data needs to be ensured.

With development of the Segment Routing over IPv6 (SRv6) technology, when a first edge node (edge) in the POP network receives service data destined for a second edge node, the first edge node encrypts the service data based on an encrypted tunnel between the first edge node and the second edge node, and then encapsulates a segment routing header (SRH) before the encrypted service data, to obtain a to-be-forwarded packet. The SRH includes a plurality of segment identifiers (Segment ID, SID), and each of the plurality of SIDs indicates one POP point in the POP network. Therefore, the SRH can indicate a forwarding path of the service data. The encapsulated packet is then forwarded, so as to forward the service data to the second edge node.

In a process of forwarding the packet carrying the service data, SID information in the packet is easily stolen and used by malicious individuals.

SUMMARY

This application provides a packet sending method, a network device, a storage medium, and a program product, to prevent SID information in an SRv6 packet transmitted in a network from being stolen and used by malicious individuals. Technical solutions are as follows:

According to a first aspect, a packet sending method is provided. In the method, a network device sends a packet, the packet includes a segment routing header SRH and a payload, and the SRH includes an encrypted field and an unencrypted field. The encrypted field includes at least an encrypted segment identifier SID list, and the SID list indicates a transmission path of the packet.

This application provides an SRH header encryption mechanism. The SRH header encryption mechanism encrypts at least the SID list in the SRH. Based on this SRH header encryption mechanism, an SID list in an SRH of an SRv6 packet transmitted over a POP network is encrypted to protect SID information in the SRH header from being leaked.

In an embodiment, the unencrypted field includes a field indicating an index of a last SID in the SID list.

The unencrypted field includes at least the field (that is, a Last Entry field) indicating the index of the last SID in the SID list. Another node may determine an end location of the SID list based on the Last Entry field, and then may determine a start location of the SRH based on an IPv6 header, so as to perform a subsequent decryption operation.

In an embodiment, the unencrypted field further includes a routing type field. In this case, the another node does not need to determine the start location of the SRH based on the IPv6 header, but based on the routing type field.

In an embodiment, the unencrypted field further includes a reserved flags field, and a value of the reserved flags field indicates that the SID list has been encrypted.

By extending the reserved flags field in the SRH, another node may first determine, by using the value of the reserved flags field, whether the SID list has been encrypted, and then determine whether a decryption operation needs to be performed.

In an embodiment, the SRH includes an extended type-length-value TLV, the extended TLV carries encryption metadata, the encrypted field is encrypted based on the encryption metadata, and the encryption metadata is not encrypted.

To facilitate another node to quickly decrypt the encrypted SID list, the encryption metadata used during encryption may be carried in the packet. For example, the encryption metadata may carry an ESP header in an ESP technology.

In an embodiment, the unencrypted field further includes a header extension length field. In a scenario in which the extended TLV is extended, the unencrypted field may further include the header extension length (Hdr Ext Length) field. Based on the header extension length field, another node can obtain the extended TLV before decrypting the SRH, and further determine the encryption metadata.

In an embodiment, the extended TLV includes an encryption flags field, and values of the encryption flags field indicate locations of the encrypted field and the unencrypted field in the SRH. Because some fields in the SRH are encrypted, a flags field of the extended TLV may be extended, so that values of the flags field indicate locations of the encrypted field and the unencrypted field in the SRH.

In an embodiment, the encrypted field further includes encrypted padding data, and the extended TLV further carries the encrypted padding data.

When block encryption is used, if a length of the last data block is insufficient, padding is performed based on the padding data. Therefore, the encrypted field further includes the encrypted padding data. In an embodiment of this application, the padding data is carried by using the extended TLV.

In an embodiment, the extended TLV further carries an integrity check value, and the integrity check value is at least used to check integrity of the SID list and a field before the SID list in the SRH.

To further improve security of the SID list, the encryption mechanism provided in an embodiment of this application further provides an integrity check function for the SID list.

According to a second aspect, another packet sending method is provided. In the method, a network device sends a packet, where the packet includes an encrypted part, a segment routing header SRH of the packet is in the encrypted part, and a payload of the packet is not in the encrypted part.

This application provides another SRH header encryption mechanism. The SRH header encryption mechanism encrypts the entire SRH. Based on the SRH header encryption mechanism, an SRH in an SRv6 packet transmitted over a POP network is encrypted to protect SID information in the SRH header from being leaked. In addition, because the payload is not in the encrypted part, in a scenario in which the payload is also encrypted, the payload is encrypted in another encrypted part. In this way, an intermediate node on a transmission path of the first packet only needs to decrypt the encrypted part to determine a next hop from the SRH, and does not need to decrypt the payload. In a case of ensuring secure transmission of the payload, forwarding efficiency of the network device is further improved.

In an embodiment, the packet includes an extension packet header, and the encrypted part is carried in the extension packet header.

In an embodiment of this application, a new packet header is extended. The new packet header includes an overall encrypted SRH, to prevent an SID list from being exposed to a network.

In an embodiment, the extension packet header further carries encryption metadata, the encrypted part is encrypted based on the encryption metadata, and the encryption metadata is not in the encrypted part. To facilitate another node to quickly decrypt the encrypted SID list, the extension packet header may carry the encryption metadata used for encryption. For example, the encryption metadata may carry an ESP header in an ESP technology.

In an embodiment, the extension packet header further carries an integrity check value, and the integrity check value is at least used to check integrity of the extension packet header.

To further improve security of the SID list, the encryption mechanism provided in an embodiment of this application further provides an integrity check function for the extension packet header.

In an embodiment, when a value of a type field of the extension packet header is a first value, the integrity check value is used to check integrity of the extension packet header and an IPv6 header of the first packet; or when the value of the type field of the extension packet header is a second value, the integrity check value is used to check integrity of the extension packet header. A flexible security check mechanism can be implemented based on the extension of the type field in the extension packet header.

In an embodiment, the IPv6 header of the first packet is located at an outer layer of the extension packet header, and a next header field in the IPv6 header indicates that a next packet header is the extension packet header.

In an embodiment of this application, the extension packet header may be located in an inner layer of the IPv6 header to replace the SRH. In this case, a value of the next header field in the IPv6 header needs to be extended.

In an embodiment, the encrypted part further includes encrypted padding data.

When block encryption is used, if a length of the last data block is insufficient, padding is performed based on the padding data. Therefore, the encrypted part further includes the encrypted padding data.

According to a third aspect, another packet sending method is provided. For technical effects of the technical solution provided in the third aspect, refer to technical effects of the packet sending method provided in the first aspect. Details are not described herein again. In the method, a network device receives a first packet, where the first packet includes a segment routing header SRH and a payload, the SRH includes an encrypted field and an unencrypted field, the encrypted field includes at least an encrypted segment identifier SID list, and the SID list indicates a transmission path of the first packet. The network device decrypts the encrypted field to obtain an SRH that does not include an encrypted field. The network device processes the first packet based on the SRH that does not include an encrypted field.

In an embodiment, an implementation in which the network device processes the first packet based on the SRH that does not include an encrypted field is as follows: when determining, based on the SRH that does not include an encrypted field, that the network device is not a destination of the payload, the network device modifies, based on a next hop of the payload, the SRH that does not include an encrypted field, and generates a second packet based on a modified SRH, where the second packet includes the modified SRH and the payload. The network device sends the second packet.

In an embodiment, the network device may further encrypt the modified SRH. Correspondingly, the SRH in the second packet includes the encrypted field and the unencrypted field.

In an embodiment, the unencrypted field includes a field indicating an index of a last SID in the SID list. In this scenario, an implementation process of decrypting the encrypted field is as follows: The network device determines an end location of the SID list based on the field that is in the SRH and that indicates the index of the last SID in the SID list; the network device determines a start location of the SID list based on an IPv6 header of the first packet; and the network device determines and obtains the encrypted SID list based on the start location and the end location of the SID list, to decrypt the encrypted SID list.

In an embodiment, the unencrypted field includes a field indicating an index of a last SID in the SID list and a routing type field. In this scenario, an implementation process of decrypting the encrypted field is as follows: The network device determines an end location of the SID list based on the field that is in the SRH and that indicates the index of the last SID in the SID list; the network device determines a start location of the SID list based on the routing type field; and the network device determines and obtains the encrypted SID list based on the start location and the end location of the SID list, to decrypt the encrypted SID list.

In an embodiment, the unencrypted field further includes a reserved flags field. In this scenario, an implementation process in which the network device decrypts the encrypted field may be as follows: when a value of the reserved flags field indicates that the SID list has been encrypted, perform an operation of decrypting the encrypted field.

In an embodiment, the SRH includes an extended type-length-value TLV. The extended TLV carries encryption metadata, and the encryption metadata is not encrypted. In this scenario, an implementation process in which the network device decrypts the encrypted field is as follows: The network device obtains the encryption metadata from the extended TLV; and the network device decrypts the encrypted field based on the encryption metadata.

In an embodiment, the unencrypted field includes a field indicating an index of a last SID in the SID list and a header extension length field. In this scenario, the network device may obtain the extended TLV based on the header extension length field and the field indicating the index of the last SID in the SID list.

In an embodiment, values of a type field of the extended TLV indicate locations of the encrypted field and the unencrypted field in the SRH. In this scenario, the network device may determine, based on the type field of the extended TLV, a location of the encrypted field in the SRH.

In an embodiment, the encrypted field further includes encrypted padding data, and the extended TLV further carries the encrypted padding data. In this scenario, an implementation process in which the network device decrypts the encrypted field is as follows: deleting the padding data from a decrypted field to obtain the SRH that does not include an encrypted field.

In an embodiment, the extended TLV further carries an integrity check value. In this scenario, the network device may further check integrity of the SID list and a field before the SID list in the SRH based on the integrity check value; and perform the operation of decrypting the encrypted field when the integrity of the SID list and the field before the SID list in the SRH is not damaged.

According to a fourth aspect, another packet sending method is provided. For technical effects of the technical solution provided in the fourth aspect, refer to technical effects of the packet sending method provided in the second aspect. Details are not described herein again.

In the method, a network device receives a first packet, where the first packet includes an encrypted part, a segment routing header SRH of the first packet is in the encrypted part, and a payload of the first packet is not in the encrypted part. The network device decrypts the encrypted part to obtain the SRH. The network device processes the first packet based on the SRH.

In an embodiment, an implementation process in which the network device processes the first packet based on the SRH is as follows: when determining, based on the SRH, that the network device is not a destination of the payload, the network device modifies the SRH based on a next hop of the payload, and generates a second packet based on a modified SRH, where the second packet includes the modified SRH and the payload.

In an embodiment, the network device further encrypts the modified SRH. Correspondingly, the second packet includes the encrypted part, and the encrypted modified SRH is in the encrypted part.

In an embodiment, the first packet includes an extension packet header, and the encrypted part is carried in the extension packet header. In this scenario, the network device obtains the encrypted part from the extension packet header.

In an embodiment, the extension packet further carries encryption metadata. In this scenario, an implementation process of decrypting the encrypted part by the network device is as follows: The network device decrypts the encrypted part based on the encryption metadata.

In an embodiment, the extension packet header further carries an integrity check value. In this scenario, an implementation process of decrypting the encrypted part by the network device is as follows: checking integrity of the extension packet header based on the integrity check value; and performing the operation of decrypting the encrypted part when the integrity of the extension packet header is not damaged.

In an embodiment, an implementation process of checking integrity of the extension packet header based on the integrity check value is as follows: when a value of the type field in the extension packet header is a first value, performing integrity check on the extension packet header and the IPv6 header of the first packet based on the integrity check value; or when the value of the type field of the extension packet header is a second value, performing integrity check on the extension packet header based on the integrity check value.

In an embodiment, the IPv6 header of the first packet is located at an outer layer of the extension packet header, and a next header field in the IPv6 header indicates that a next packet header is the extension packet header. In this scenario, the network device obtains the extension packet header based on the next header field in the IPv6 header.

In an embodiment, the encrypted part further includes encrypted padding data. In this scenario, an implementation process of decrypting the encrypted part by the network device is as follows: deleting the padding data from a decrypted field to obtain the SRH.

According to a fifth aspect, a network device is provided, and the network device has a function of implementing behavior of the packet sending method in the first aspect. The network device includes at least one module, and the at least one module is configured to implement the packet sending method provided in the first aspect.

According to a sixth aspect, a network device is provided, and the network device has a function of implementing behavior of the packet sending method in the second aspect. The network device includes at least one module, and the at least one module is configured to implement the packet sending method provided in the second aspect.

According to a seventh aspect, a network device is provided, and the network device has a function of implementing behavior of the packet sending method in the third aspect. The network device includes at least one module, and the at least one module is configured to implement the packet sending method provided in the third aspect.

According to an eighth aspect, a network device is provided, and the network device has a function of implementing behavior of the packet sending method in the fourth aspect. The network device includes at least one module, and the at least one module is configured to implement the packet sending method provided in the fourth aspect.

According to a ninth aspect, a network device is provided, and the network device includes: a memory, storing instructions; and a processor connected to the memory, where when the instructions are run in the processor, the network device is enabled to perform the method according to any one of the first aspect, the second aspect, the third aspect, or the fourth aspect.

According to a tenth aspect, a computer-readable storage medium is provided, where the computer-readable storage medium stores instructions, and when the instructions are run in a processor, the method according to any one of the first aspect, the second aspect, the third aspect, or the fourth aspect is implemented.

According to an eleventh aspect, a computer program product is provided, where the computer program product includes a program, and when the program runs in a processor, the method according to any one of the first aspect, the second aspect, the third aspect, or the fourth aspect is implemented.

Technical effects obtained in the fifth aspect to the eleventh aspect are similar to the technical effects obtained in the corresponding technical means in the first aspect to the fourth aspect, and details are not described herein again.

BRIEF DESCRIPTION OF DRAWINGS

FIG. 5 is a schematic diagram of a format of an IPv6 data packet carrying an SRH according to an embodiment of this application;

FIG. 6 is a flowchart of a packet sending method according to an embodiment of this application;

FIG. 10 is a flowchart of another packet sending method according to an embodiment of this application;

DESCRIPTION OF EMBODIMENTS

To make the objectives, technical solutions, and advantages of this application clearer, the following further describes the implementations of this application in detail with reference to the accompanying drawings.

It should be understood that "a plurality of" mentioned in this specification refers to two or more. In the descriptions of this application, unless otherwise stated, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Before the embodiments of this application are explained and described, an application scenario of the embodiments of this application is first explained and described.

A POP network is a typical SD-WAN application scenario. Based on the POP network, an enterprise or a carrier can deploy a virtualized SD-WAN device on a public cloud as a POP network access point. The access point is also called POP node. The access point uses the inter-cloud internet and cloud private line resources to quickly and flexibly build an SD-WAN backbone network covering a large area. An enterprise branch site connects to a nearest POP node through a local internet line, and cross-region mutual service access is implemented through a cloud SD-WAN backbone network, so as to meet requirements of services such as enterprise networking, cloud access, and internet access. The SD-WAN backbone network is also called a POP backbone network.

An enterprise's POP backbone network can be constructed based on cloud resources provided by different public cloud service providers to improve coverage of POP nodes in the POP backbone network. In a multi-cloud POP backbone network scenario, there are a plurality of paths for mutual service access between enterprise sites for selection, and a plurality of POP nodes can be deployed between the enterprise sites. In this case, the POP network needs to support crossing of a plurality of POP nodes and support cross-POP end-to-end dynamic routing.

Figure 1:
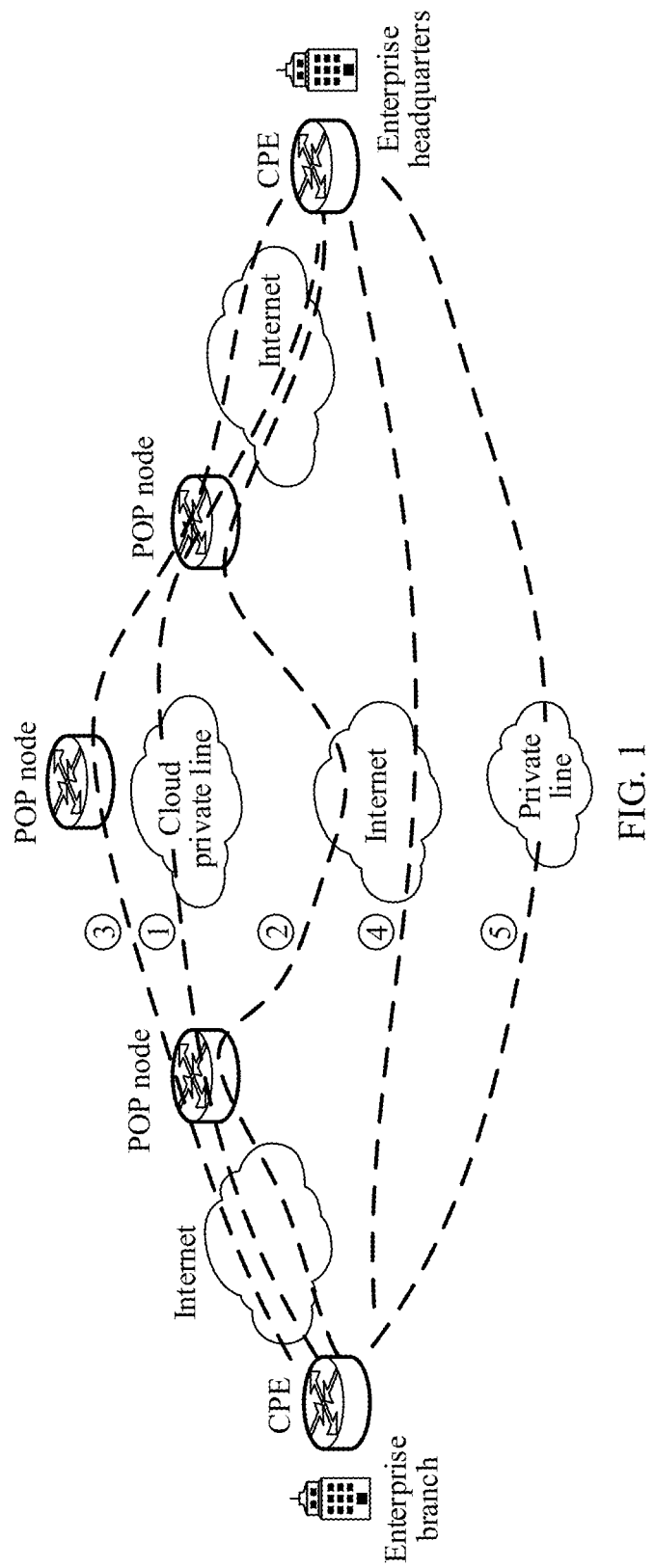
FIG. 1 is a schematic diagram of a path for mutual access between an enterprise branch and headquarters based on a POP network according to an embodiment of this application.

In the POP network scenario, a plurality of paths for mutual service access may be selected. A mutual access path between an enterprise branch and headquarters is used as an example herein. FIG. 1 is a schematic diagram of a mutual access path between an enterprise branch and headquarters based on a POP network according to an embodiment of this application. In the POP network routing scenario shown in FIG. 1, the mutual access path between the enterprise branch and the headquarters may include the following optional paths:

A path 1 (marked as ① in FIG. 1) is a cross-POP path. The path 1 includes two POP nodes, and the POP nodes communicate with each other through a cloud private line. A path 2 (marked as ② in FIG. 1) is also a cross-POP path. The path 2 includes two POP nodes, and the POP nodes communicate with each other through the cloud internet. A path 3 (marked as ③ in FIG. 1) is also a cross-POP path. There are three POP nodes on the path 3, and the three POP nodes may communicate with each other through a cloud private line or the cloud internet. A path 4 (marked as ④ in FIG. 1) is a direct path. The enterprise branch and a site are directly connected through the internet. A path 5 (marked as ⑤ in FIG. 1) is also a direct path. The enterprise branch and a site are directly connected through a private line.

In the foregoing POP network scenario, to ensure security of a service packet transmitted over the POP network, a general implementation solution of SD-WAN vendors in the industry is to use segmented tunnels and hop-by-hop encryption and decryption. A principle of the solution is as follows: An IPsec encrypted tunnel is established between an edge node and a POP node based on the internet, and an IPsec encrypted tunnel is established between POP nodes based on the internet, or an encrypted or unencrypted tunnel is established between POP nodes based on a carrier private line or a cloud private line. The edge node refers to a node on an edge of the POP network. The edge node is used to connect a user packet to the POP network. A service packet is transmitted through a tunnel segment by segment over the POP network. A POP point decrypts and decapsulates the received service packet, searches for a next hop through route lookup based on an IP header of the service packet, then encapsulates the packet, and forwards the packet to a next-hop POP node or edge node.

In the foregoing solution, IPsec encrypted tunnels are established between an edge node and a POP node and between POP nodes. Therefore, security check on a service packet on the internet can be implemented by using the foregoing solution. However, in the foregoing solution, the POP node needs to look up a route based on an IP header of an inner packet. In this case, the complete inner packet needs to be decrypted. As a result, decapsulation and route lookup efficiency is relatively low. In addition, after the service packet is completely decrypted at the POP node, there is a security risk that an attacker may attack the POP node to obtain user data. In addition, hop-by-hop routing is implemented by a POP node in the POP network. That is, a path for forwarding a service packet is selected by each intermediate POP node. Cross-POP end-to-end direct routing cannot be implemented.

On this basis, the idea of segment routing is introduced. A principle of a solution of transmitting a service packet over the POP network based on segment routing is as follows: An end-to-end IPsec encrypted tunnel is established between edge nodes across intermediate POP nodes. When encapsulating a service packet, an edge node encapsulates an SRH outside IPsec encapsulation, and the SRH is not encrypted. The SRH records SID information of POP nodes that the service packet passes through. The edge node sends the encapsulated service packet to a POP node through a tunnel. When receiving the service packet, the POP node does not decapsulate the IPsec packet in the service packet, but directly forwards the service packet to a next hop based on the SID information in the SRH.

SD-WAN service providers in China have built more than 400 POP nodes around the world based on public cloud resources to provide global SD-WAN access services for enterprise customers. In addition, the SRH can be exposed for path control by using the segment routing technology to encrypt an innerIP header and a payload (Payload) of the service packet. After receiving the service packet, the intermediate POP node forwards the packet based on path information in the SRH.

The foregoing service packet forwarding solution implements end-to-end encryption on the POP network. In addition, in the foregoing technical solution, the intermediate POP node may forward the service packet without decrypting the IPsec packet in the service packet. Therefore, forwarding efficiency of the POP node is relatively high. In addition, the foregoing solution supports transmission of a service packet across a plurality of POP nodes over the POP network, and a transmission path of the service packet can be controlled in a centralized manner. Therefore, cross-POP end-to-end routing can be supported. However, it is insecure to expose the SID information of the POP node on the internet in the foregoing solution, and there is no security check mechanism for a valid packet and an attack packet in the foregoing solution.

Based on the foregoing scenario, embodiments of this application introduce a new SRH encryption technology, to resolve the problem that performance of the POP node conflicts with security, ensure forwarding performance of the POP node in the POP network, and resolve security problems such as SID information leakage and packet validity check.

Figure 2:
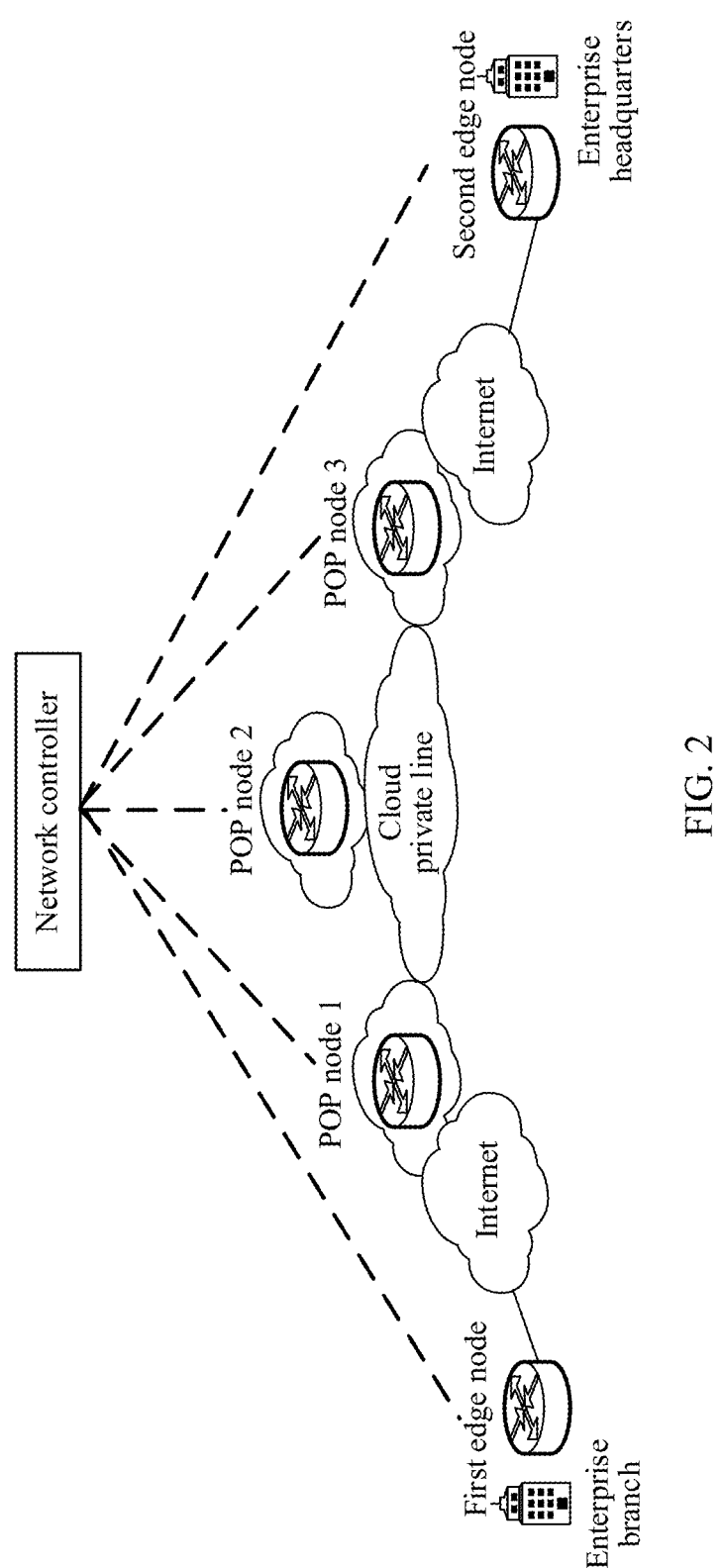
FIG. 2 is a schematic diagram of a POP network system architecture according to an embodiment of this application.

For ease of subsequent description, a POP network system architecture in embodiments of this application is first explained and described herein. FIG. 2 is a schematic diagram of a POP network system architecture according to an embodiment of this application. As shown in FIG. 2, the POP network includes a network controller, a first edge node, a plurality of POP nodes (a POP node 1, a POP node 2, and a POP node 3 in FIG. 2 are examples), and a second edge node.

The first edge node communicates with the POP node 1 in a wired or wireless manner, the POP node 1 communicates with the POP node 2 in a wired or wireless manner, the POP node 2 communicates with the POP node 3 in a wired or wireless manner, and the POP node 3 communicates with the second edge node in a wired or wireless manner. Each edge node and each POP node communicate with the network controller in a wired or wireless manner.

The network controller in FIG. 2 is configured to provide POP network orchestration and network management functions. These functions include but are not limited to device deployment on edge nodes and POP nodes, unified device management, POP network creation, SR path policy control, network value-added service policy definition, alarm/log information collection, link quality statistics collection, and the like.

An edge node is an edge node at an enterprise site that needs to be connected through the POP network. Edge nodes include an enterprise branch site, an enterprise headquarters or data center site, and a public cloud site. As shown in FIG. 2, for example, the first edge node may be an edge node deployed on an enterprise branch side, and the first edge node is configured to connect the enterprise branch to the POP network. For example, the second edge node may be an edge node deployed on an enterprise headquarters side, and the second edge node is configured to connect the enterprise headquarters to the POP network. Therefore, based on the POP network shown in FIG. 2, the enterprise branch and the enterprise headquarters access each other through the POP network.

A POP node is an intermediate node in the POP network. The POP node is an ingress gateway for an edge node to connect to the POP network. In addition, the POP node connects the current POP network and a POP network in another region through an underlay backbone network provided by a carrier or public cloud.

It should be noted that, in FIG. 2, two edge nodes and three POP nodes are used as an example for description. A quantity of edge nodes and a quantity of POP nodes included in the POP network are not limited in this embodiment of this application.

The following describes in detail the system architecture of the edge nodes and the POP nodes in FIG. 2.

Figure 3:
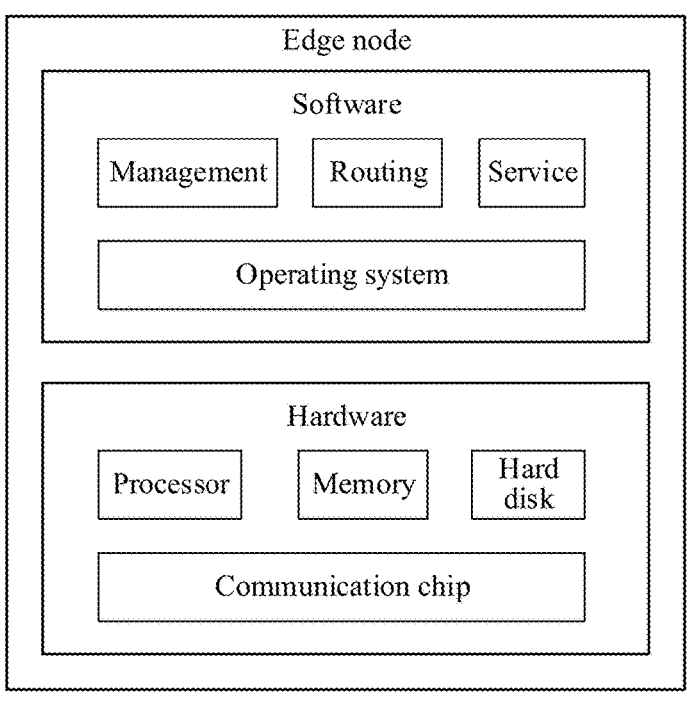
FIG. 3 is a schematic diagram of hardware and software architectures of an edge node according to an embodiment of this application.

FIG. 3 is a schematic diagram of hardware and software architectures of an edge node according to an embodiment of this application. As shown in FIG. 3, software of the edge node includes a management module, a routing module, a service module, an operating system, and the like. These software modules run on the hardware of the edge node.

The service module is also referred to as a user plane, a forwarding plane, or a data plane. The service module is configured to process and forward various types of data on different ports of the device. The service module further forwards traffic based on a forwarding entry through hardware. The routing module is also called a control plane. The routing module is configured to control and manage operation of all network protocols. The routing module further provides various network information and forwarding query entries required by the data plane. The management module is also called a management plane. The management module is intended for system operation and maintenance personnel (or external third-party management software). The management module provides input and output, user management, authentication (License), and monitoring, configuration, alarm, and statistics collection of managed objects. The management module does not directly affect a system running status.

As shown in FIG. 3, hardware of the edge node includes a processor, a memory, a hard disk, and a communication chip.

The processor in FIG. 3 may be a general-purpose central processing unit (CPU), an application-specific integrated circuit (ASIC), or one or more integrated circuits configured to control program execution of the solutions in embodiments of this application.

The memory in FIG. 3 refers to an internal memory that directly exchanges data with the processor. The memory can read and write data at any time at a high speed, and is used as a temporary data memory of an operating system or another running program. The memory includes at least two types of memories. For example, the memory may be a random access memory or a read only memory (ROM). For example, the random access memory is a dynamic random access memory (DRAM) or a storage class memory (SCM). When a total amount of data in the memory reaches a specific threshold, the processor sends data stored in the memory to the hard disk for persistent storage. The hard disk in FIG. 3 is configured to provide a storage resource, for example, store data. The hard disk may be a magnetic disk or another type of storage medium, for example, a solid state disk or a shingled magnetic recording hard disk.

The communication chip in FIG. 3 uses any apparatus such as a transceiver, and is configured to communicate with another device or a communication network, for example, an Ethernet, a radio access network (RAN), or a wireless local area network (WLAN).

Figure 4:
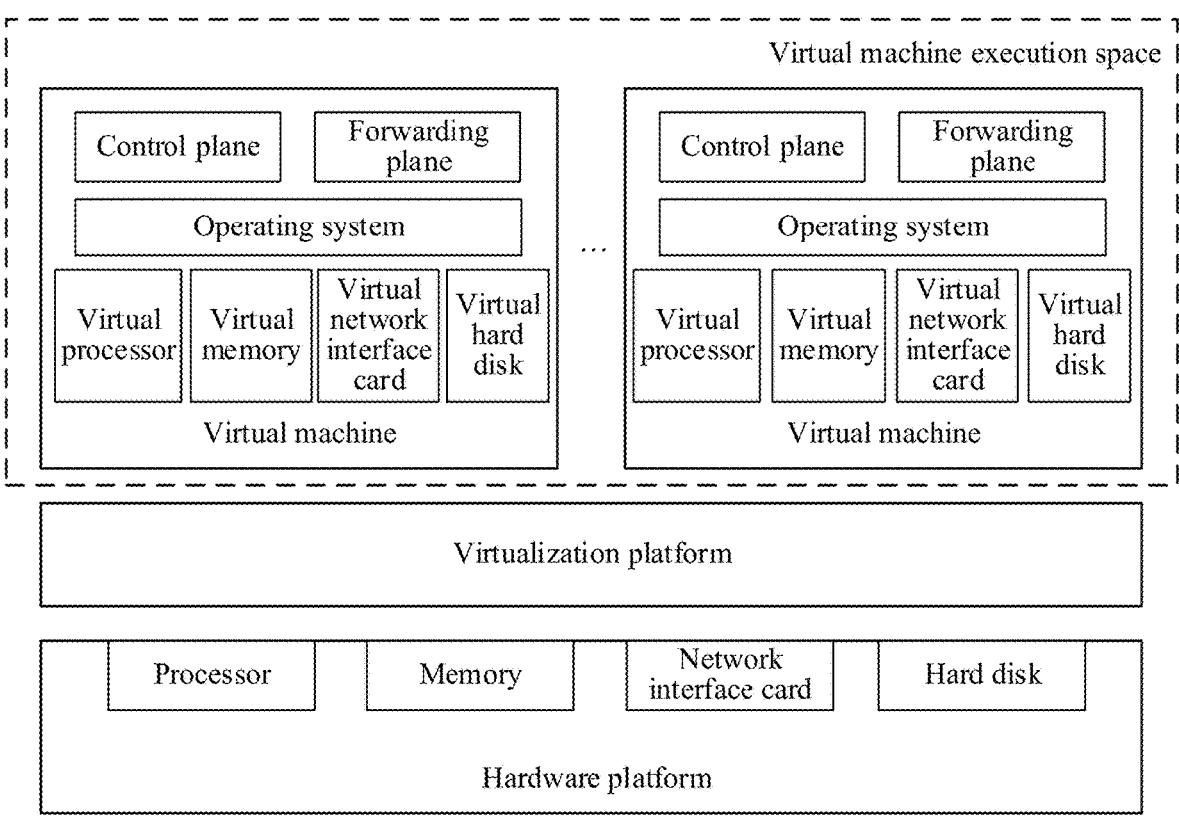
FIG. 4 is a schematic diagram of hardware and software architectures of a POP node according to an embodiment of this application.

In addition, the POP node may be deployed on a server in virtualization mode. For example, the POP node is deployed in a data center of a carrier, or is deployed on a public cloud. In this scenario, software and hardware architectures of the POP node are as shown in FIG. 4. As shown in FIG. 4, a system architecture of a virtualized POP node includes a hardware platform, a virtualization platform (hypervisor), and virtual machine execution space. The hardware platform refers to a physical structure of the POP node, and specifically includes a processor, a memory, a hard disk, a network interface card, and the like. The virtualization platform provides an intermediate layer between physical hardware and virtual machines, and is responsible for coordinating access of the virtual machines to the hardware platform. A plurality of virtual machines run in the virtual machine execution space, and each virtual machine is equivalent to a virtual POP node, so as to implement a function of the POP node. An operating system of the virtual machine runs on a virtual hardware platform, and the virtual hardware platform includes a virtualized memory, a virtualized processor, a virtualized hard disk (storage), a virtualized network interface card (nic), and the like. Each virtual machine includes a control plane and a forwarding plane. The control plane is used to manage forwarding policies of POP nodes, and the forwarding plane is used by the POP node to forward a service packet. That is, the forwarding plane of the POP node is decoupled from the control plane.

In an embodiment, the POP node may alternatively be in a form of a physical device. In this case, software and hardware architectures of the POP node are basically the same as the software and hardware architectures of the edge node in FIG. 3, and details are not described herein again.

It should be noted that the foregoing uses a POP network as an example to describe an application scenario of this application. In an embodiment, the SRH encryption technical solution provided in embodiments of this application may also be applied to another scenario in which a packet is sent based on the SR technology. Examples are not described one by one herein again.

Because the technical solution provided in the embodiments of this application is used to encrypt an SRH, for ease of subsequent description, the SRv6 technology is briefly described herein.

Based on SR on an IPv6 forwarding plane, a segment routing header (SRH) is inserted into an IPv6 packet, and an explicit IPv6 address stack is encapsulated into the SRH. An intermediate node continuously updates a destination address and an offset address stack to complete hop-by-hop forwarding. The SRv6 technology is to use the foregoing IPv6 forwarding technology to implement network programmability through a flexible IPv6 extension header. The SRv6 defines some IPv6 addresses as instantiated SIDs. Each SID has its own explicit functions. Through different SID operations, a simplified VPN and flexible path planning are implemented.

FIG. 5 is a schematic diagram of a format of an IPv6 data packet carrying an SRH according to an embodiment of this application. As shown in FIG. 5, the IPv6 data packet includes an IPv6 header (the IPv6 header is also an outer IP header), an SRH, an inner IP header, and a payload (the inner IP header and the payload are not shown in FIG. 5).

The IPv6 header includes a version field, a traffic class field, a flow label field, a payload length field, a next header field, a hop limit field, a source address field, a destination address field, and the like. The next header field indicates a type of a next header of the IPv6 header in the IPv6 data packet. The source address indicates a source address of the IPv6 data packet, and the destination address indicates a destination address of the IPv6 data packet. For explanations of other fields in the IPv6 header, refer to a related standard protocol. This is not limited in this embodiment of this application.

As shown in FIG. 5, the SRH includes a next header field, a header extension length (Hdr Ext len) field, a routing type field, a segment left (SL) field, a field (Last Entry) indicating an index of a last SID in an SID list, a flags (Flags) field, a tag field, an SID list field, and an optional type-length-value (TLV) field.

Each of the following six fields: the next header field, the header extension length field, the routing type field, the SL field, the field indicating the index of the last SID in the SID list, and the flags field has a length of 8 bits, and a length of the tag field is 16 bits. A total length of the seven fields is 8 bytes, and a length of the first eight bytes in the SRH is fixed. For ease of subsequent description, the part before the optional TLV in the SRH is referred to as an SRH standard header. In this way, the SRH includes the SRH standard header and the optional TLV, and the SRH standard header includes the first eight fixed bytes and the SID list.

The next header field indicates a type of a next header of the SRH, and the header extension length field indicates a length of another field that does not include the first eight bytes in the SRH. The routing type field indicates a type of a current header. For example, a value of the routing type field is equal to 4, indicating that the current header is the SRH. The segment left indicates a quantity of intermediate nodes that should still be accessed before reaching the destination node. Each time the packet passes through a node indicated by an SID in the SID list, the segment left is decreased by 1. The flags field is used to carry identification information of some data packets, and the tag field is used to identify data packets of a same group. The optional TLV is used by the SRH to implement more functions.

As shown in FIG. 5, the SID list includes N+1 SIDs: Segment List [0], Segment List [1], . . . , and Segment List [N]. Each SID may correspond to a 128-bit IPv6 address, and is used to identify a node or a link that has the SID on the forwarding path.

Based on the SRH shown in FIG. 5, for the POP network shown in FIG. 2, when sending a packet to the second edge node, the first edge node may directly determine a forwarding path from the first edge node to the second edge node. Based on an SID of each node on the forwarding path, an SRH header is encapsulated in the packet to implement end-to-end direct routing on the POP network.

The following describes in detail the SRH encryption technology provided in embodiments of this application. Specifically, embodiments of this application provide two SRH encryption mechanisms. For ease of subsequent description, the two SRH encryption mechanisms are respectively referred to as a first SRH encryption mechanism and a second SRH encryption mechanism. In the first SRH encryption mechanism, only a part of information (the part of information includes at least an SID list) in an SRH is encrypted, and in the second SRH encryption mechanism, a complete SRH is encrypted. The following two embodiments are used to describe the two SRH encryption mechanisms respectively.

FIG. 6 is a flowchart of a packet sending method according to an embodiment of this application. The method is used to explain and describe the first SRH encryption mechanism. As shown in FIG. 6, the method includes the following operations.

Operation 601: A first device sends a first packet, where the first packet includes an SRH and a payload, the SRH includes an encrypted field and an unencrypted field, the encrypted field includes at least an encrypted segment identifier SID list, and the SID list indicates a transmission path of the first packet.

In this embodiment of this application, some fields in the SRH are encrypted. After the encryption, the SRH is still presented in an SRH format externally, but some fields are changed from plaintext to ciphertext. Therefore, the SRH needs to include the unencrypted field. A subsequent node may know that the current packet header is an SRH based on the unencrypted field.

Because at least the SID list needs to be encrypted, to facilitate another node to decrypt the SID list, the another node needs to determine a specific location of the SID list based on other information in the SRH. Therefore, in some embodiments, the unencrypted field includes a field (Last Entry) indicating an index of the last SID in the SID list. Because a length of the first eight bytes in the SRH is fixed, and a start location of the SRH may be determined based on an IPv6 header at an outer layer of the SRH, the start location and an end location of the SID list may be determined based on the Last Entry field, that is, a specific location of the SID list is determined.

In some other embodiments, in addition to the Last Entry field, the unencrypted field may further include a routing type field. In this scenario, another node may determine the specific location of the SRH based on the routing typefield and the Last Entry field.

In some other embodiments, some information used in the encryption process may be further added to the packet, so that another node subsequently decrypts the encrypted field based on the information. For example, the information used in the encryption process may be carried by using an extended TLV. Related content of the extended TLV is described in detail later. In this scenario, the unencrypted field may further include a header extension length (Hdr Ext len) field. Because the header extension length field indicates a length of another field excluding the first eight bytes in the SRH, a specific location of the TLV in the SRH may be determined based on the Hdr Ext len field and the foregoing Last Entry field, so that another node obtains, based on the extended TLV, the information used in the encryption process, and further decrypts the encrypted field based on the information.

In this embodiment of this application, the encrypted field in the SRH needs to include at least the SID list, to prevent the SID list from being exposed to a network.

In addition, because the SID list in the SRH is encrypted, to facilitate subsequent other nodes to quickly learn whether the SID list in the packet is encrypted, a reserved flags field in an SRH standard header may further be extended, so that a value of the reserved flags field can indicate whether the SID list is encrypted. In some embodiments, the reserved flags field includes a specific bit. When a value of the bit is 1, it indicates that the SID list in the SRH is encrypted; or when a value of the bit is 0, it indicates that the SID list in the SRH is not encrypted. When the value of the reserved flags field in the SRH is used to indicate whether the SID list is encrypted, the reserved flags field cannot be encrypted. In other words, the foregoing unencrypted field further includes the reserved flags field. In an embodiment, if all nodes in the network agree in advance to encrypt the SID list, the foregoing extension may not be performed on the reserved flags field.

In an embodiment, if the value of the reserved flags field in the SRH is not used to indicate whether the SID list is encrypted, the reserved flags field may be placed in the encrypted field, or may be placed in the unencrypted field.

In an embodiment, in some embodiments, the encrypted field may further include an SL field, so as to prevent an attacker from inferring a subsequent forwarding path of the packet based on the SL field. In addition, the encrypted field may further include a next header field, a tag field, and the like.

Based on any one of the foregoing implementations about the encrypted field and the unencrypted field, the first device may generate the foregoing first packet, and send the first packet. The following describes operation 601 in detail by using an example in which the first device is the first edge node in the POP network shown in FIG. 2, and a destination of the payload of the first packet is the second edge node.

For the network shown in FIG. 2, in some embodiments, an implementation process of operation 601 may be implemented by using the following operations.

Operation (1): The first edge node receives a service packet sent by a local area network (LAN) side of the enterprise branch.

The service packet includes an inner IP header (the inner IP header is also referred to as an original IP header) and a payload. The inner IP header carries a source IP address and a destination IP address of the service packet, where the source IP address may be an IP address of a terminal device in the local area network (LAN) of the enterprise branch, and the destination IP address may be an IP address of a terminal device in a local area network of the enterprise headquarters.

Operation (2): The first edge node generates an SRH, and encrypts some information in the SRH, so that the SRH includes an encrypted field and an unencrypted field.

The first edge node determines a forwarding path based on the destination IP address in the inner IP header of the service packet. As shown in FIG. 2, the forwarding path is: the first edge node→the POP node 1→the POP node 2→the POP node 3→the second edge node. An SID list in the SRH is determined based on the forwarding path, where the SID list includes an SID of the POP node 1, an SID of the POP node 2, an SID of the POP node 3, and an SID of the second edge node. The SRH that has not yet been encrypted can be generated based on the SID list and a basic format of an SRH. Then, it is determined which field in the SRH is a to-be-encrypted field and which field is an unencrypted field, so as to encrypt the to-be-encrypted field in the SRH, so that the finally generated SRH includes the encrypted field and the unencrypted field. The encrypted field includes at least an encrypted SID list.

Figure 7:
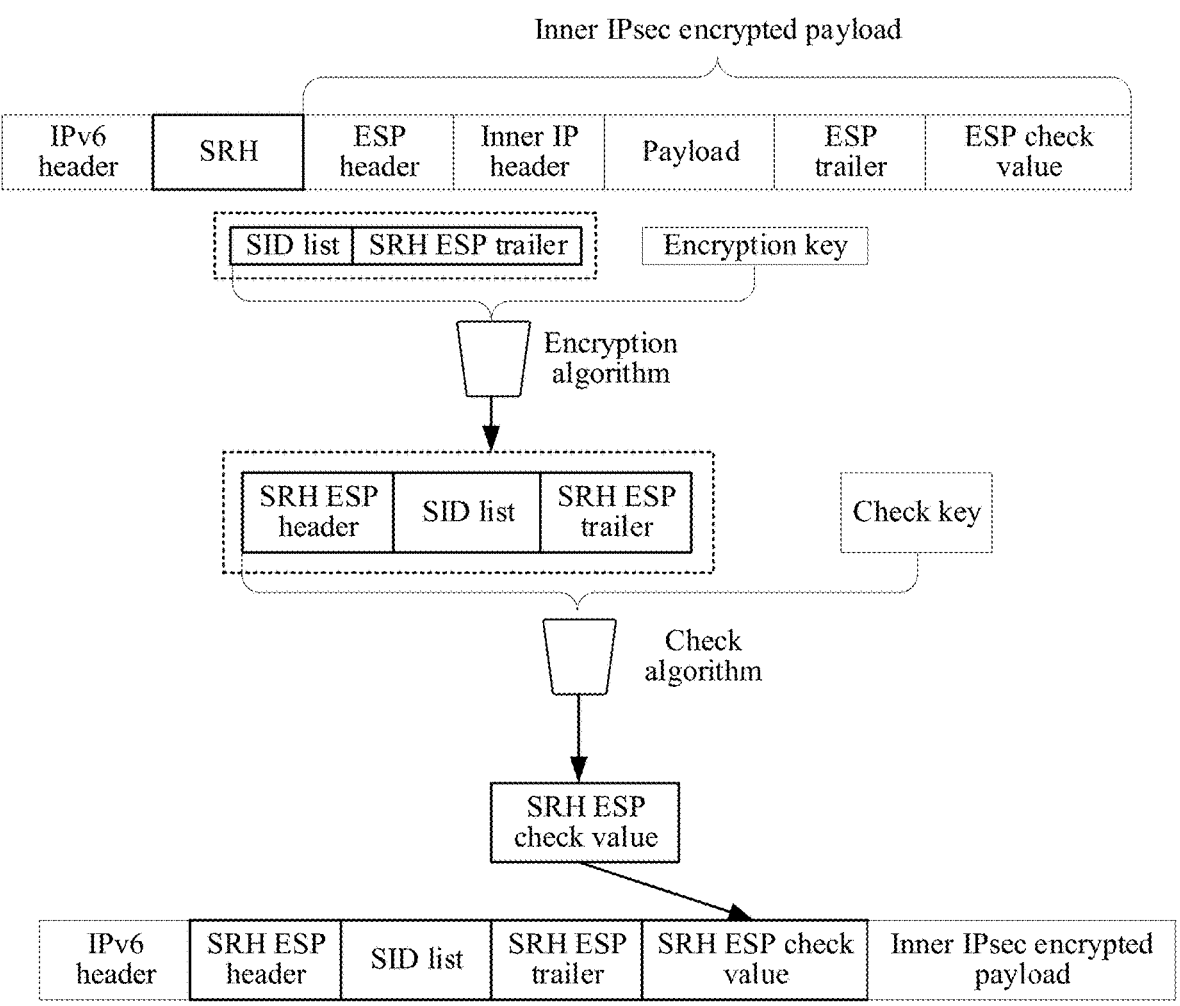
FIG. 7 is a schematic diagram of an encryption technology according to an embodiment of this application.

After the to-be-encrypted field in the SRH is determined, the to-be-encrypted field may be encrypted based on an encryption technology. FIG. 7 is a schematic diagram of an encryption technology according to an embodiment of this application. In FIG. 7, the to-be-encrypted field in the SRH is encrypted by using an encapsulating security payload (ESP) encryption technology. As shown in FIG. 7, a basic principle of the ESP encryption technology is as follows: The to-be-encrypted field (only the SID list is used as an example in FIG. 7) in the SRH and an ESP trailer are encrypted together by using an encryption key and an encryption algorithm, to obtain an encrypted field. Because the SRH is currently being encrypted, to facilitate subsequent differentiation from another ESP technology, the ESP trailer used for SRH encryption in FIG. 7 and subsequently is referred to as an SRH ESP trailer. Then, an integrity check value (ICV) is obtained for the SRH standard header together with the SID list and an ESP header by using a check key and a check algorithm. The integrity check value is an SRH check result. Subsequently, another node may first check integrity of the SRH based on the integrity check value, and then decrypt the encrypted field after the integrity check succeeds, to obtain an SRH that does not include an encrypted field. Similarly, to facilitate subsequent differentiation from another ESP technology, in FIG. 7 and subsequently, the ESP header used for SRH encryption is referred to as an SRH ESP header, and the integrity check value generated based on the SRH is referred to as an SRH ESP check value.

It should be noted that locations of the SRH ESP header, the SRH ESP trailer, and the SRH ESP check value in the packet at the bottom of FIG. 7 are not actual locations of the SRH ESP header, the SRH ESP trailer, and the SRH ESP check value in the packet. FIG. 7 is used as an example to illustrate functions of the SRH ESP header, the SRH ESP trailer, and the SRH ESP check value. The actual locations of the SRH ESP header, the SRH ESP trailer, and the SRH ESP check value are described in detail in the following FIG. 8A and FIG. 8B.

The SRH ESP trailer includes padding data (Padding) and a pad length (Pad length). When block encryption is used, if a length of the last data block is insufficient, padding is performed based on the padding data. The pad length refers to a length of a data segment used for padding, and helps find the data segment used for padding during unpacking.

The SRH ESP header includes two parts: a security parameter index (SPI) and a sequence number. The SPI determines a security association (SA) corresponding to the encrypted field. Another node can perform integrity check on the encrypted field according to a digest algorithm and a check key that are specified by the SA, and decrypt the encrypted field according to an encryption algorithm and a decryption key that are specified by the SA. The sequence number is used to ensure that data is new and prevent a replay attack.

The ESP encryption technology is an optional encryption implementation in this embodiment of this application, and any encryption technology may be used to encrypt the to-be-encrypted field in the SRH.

It should be noted that, in addition to the foregoing encryption performed on the SRH in the first packet, IPsec encryption and encapsulation may be further performed on the service packet. As shown in FIG. 7, a service packet obtained after IPsec encryption and encapsulation includes an ESP header, an inner IP header, a payload, an ESP trailer, and an ESP check value. In FIG. 7, the service packet obtained after IPsec encryption and encapsulation is further referred to as an inner IPsec encryption payload. In addition, for related explanations of the ESP header, the ESP trailer, and the ESP check value in the service packet obtained after IPsec encryption and encapsulation, refer to the foregoing related explanations of performing ESP encryption on the SRH, and details are not described herein again.

The integrity check value is generated based on the SRH standard header. Therefore, the integrity check value is used to perform integrity check on the SRH standard header. In an embodiment, in some other embodiments, after the encrypted field is obtained, the integrity check value may alternatively be generated based on the entire SRH including the encrypted field. In this case, the integrity check value is used to check integrity of the first eight bytes in the SRH, the SID list, and the extended TLV. In an embodiment, in some other embodiments, after the encrypted field is obtained, the integrity check value may alternatively be generated based on the entire SRH and the IPv6 header. In this case, the integrity check value is used to check integrity of the SRH and the IPv6 header.

Based on the foregoing different scenarios, an integrity check mark field may be further extended in the SRH, and a value of the integrity check mark field can indicate integrity of a part that the integrity check value is used to check. A specific location of the integrity check mark field is not limited in this embodiment of this application. For example, the integrity check mark field may be extended in the flags field of the SRH. In other words, in this embodiment of this application, the flags field of the SRH further includes the integrity check mark field, and a value of the integrity check mark field indicates a field on which integrity check needs to be performed.

It should be noted that, if a basis for generating the integrity check value is universally agreed in the encryption mechanism, that is, integrity of a part that the integrity check value is used to check is universally agreed, the integrity check mark field does not need to be extended. For example, in the encryption mechanism shown in FIG. 6, it is universally agreed upon to use the integrity check value to check integrity of the first eight bytes in the SRH and the SID list. Alternatively, it is universally agreed upon to use the integrity check value to check integrity of the entire SRH.

In addition, in some other embodiments, after some fields in the SRH are encrypted, the integrity check value for the encrypted field may not be generated. In this way, the encrypted field only needs to be decrypted subsequently, and integrity check does not need to be performed on the encrypted field.

In addition, as described in the foregoing content, after the to-be-encrypted field in the SRH is encrypted, some information used in the encryption process may be added to the packet, so that another node subsequently decrypts, or decrypts and checks the encrypted field based on the information. In an embodiment, if all nodes in the network agree in advance to use a unified encryption and checking technology, the information used in the encryption process does not need to be added to the packet, and other nodes may process the encrypted field based on the agreed encryption and checking technology. The information used in the foregoing process of encrypting the to-be-encrypted field in the SRH may be referred to as encryption metadata.

In some embodiments, one TLV may be extended in the SRH, that is, an extended TLV is added in the SRH, and the extended TLV is used to carry the foregoing encryption metadata.

For example, the extended TLV carries the encryption metadata, the encrypted field in the SRH is encrypted based on the encryption metadata, and it needs to be ensured that the encryption metadata is not encrypted, so that another node subsequently processes the encrypted field in the SRH based on the encryption metadata. For example, the encryption metadata includes the SRH ESP header in the foregoing ESP technology.

For another example, because some fields in the SRH are encrypted, a flags field of the extended TLV may be extended, so that values of the flags field indicate locations of the encrypted field and the unencrypted field in the SRH. In other words, the extended TLV may further include an encryption flags field. The encryption flags field indicates the locations of the encrypted field and the unencrypted field in the SRH, so that another node subsequently determines, based on the encryption flags field, which field in the SRH is encrypted.

In an embodiment, the encryption flags field includes eight bit groups, and the eight bit groups are respectively corresponding to the eight fields: the next header field, the header extension length field, the routing type field, the SL field, the field indicating an index of the last SID list in the SID list, the flags field, the tag field, and the SID list field in the SRH standard header. A value of each bit group indicates whether a corresponding field is encrypted. For example, the encryption flags field includes eight bits, and the eight bits are in a one-to-one correspondence with the foregoing eight fields. For any bit, when a value of the bit is 1, it indicates that a corresponding field is encrypted; or when the value of the bit is 0, it indicates that the corresponding field is not encrypted.

For another example, in the foregoing ESP technology-based encryption scenario, the extended TLV further carries encrypted padding data. As can be learned from the foregoing ESP encryption technology principle, in this case, the encrypted field in the SRH further includes the encrypted padding data.

For another example, when the integrity check value is further determined for the encrypted field, the extended TLV further carries the integrity check value, and the integrity check value is used to check integrity of the encrypted field in the SRH.

Figure 8A:
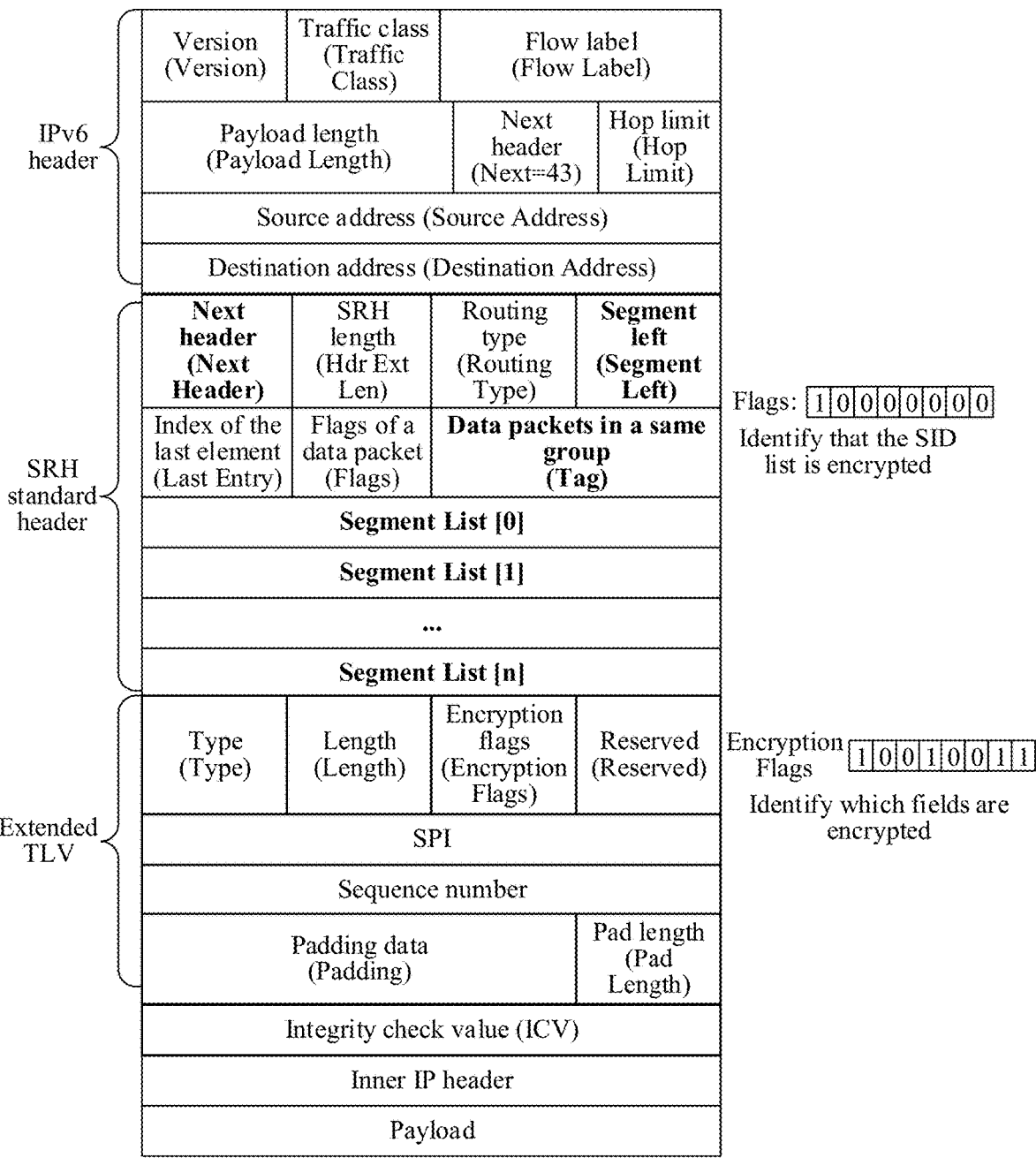
FIG. 8A and FIG. 8B are a schematic diagram of a format of a first packet according to an embodiment of this application.
Figures 8A, 8B:
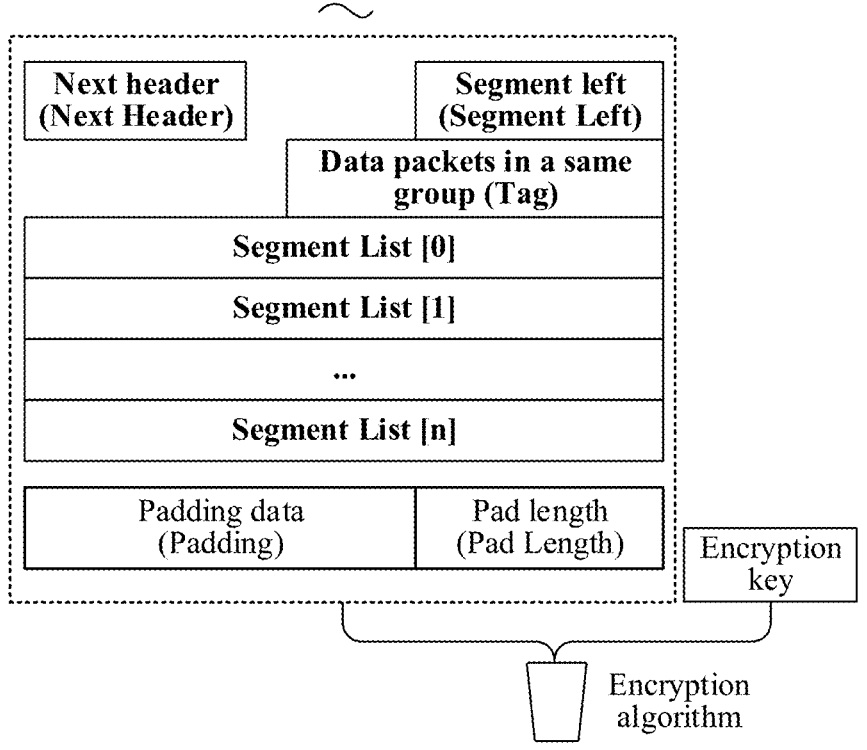

FIG. 8A and FIG. 8B are a schematic diagram of a format of a first packet according to an embodiment of this application. As shown in FIG. 8A and FIG. 8B, the first packet includes an IPv6 header, an SRH, an inner IP header, and a payload. For explanations of fields in the IPv6 header and the inner IP header, refer to the foregoing related content, and details are not described herein again.

As shown in FIG. 8A and FIG. 8B, the SRH includes an SRH standard header and an extended TLV. For explanations of fields in the SRH standard header, refer to related content in FIG. 5. Details are not described herein again. In FIG. 8A and FIG. 8B, encrypted fields (in bold in FIG. 8A and FIG. 8B) in the SRH include a next headerfield, an SL field, a tag field, and an SID list field. Unencrypted fields include a header extension length (Hdr Ext len) field, a routing type field, a field (Last Entry) indicating an index of the last SID in the SID list, and a flags field.

A value of the first bit in the flags field in the SRH is 1, indicating that the SID list in the SRH is encrypted.

The extended TLV includes a type field, a length field, an encryption flags field, a reserved field, an SPI field, a sequence number field, a padding data field, a pad length field, and an integrity check value field.

The type field is a type that needs to be newly applied for, and the type is used to indicate that the extended TLV is used to carry encryption metadata. The length field indicates a length of the extended TLV. The encryption flags field includes eight bits, which are respectively corresponding to the eight fields: the next header field, the header extension length field, the routing type field, the SL field, the field indicating the index of the last SID in the SID list, the flags field, the tag field, and the SID list field. A value of each bit group indicates whether a corresponding field is encrypted.

The SPI field and the sequence number field are respectively used to carry an SPI and a sequence number in the foregoing SRH ESP header. The padding data field and the pad length field are respectively used to carry padding data and a pad length in the foregoing SRH ESP trailer. The integrity check value field is used to carry the ICV obtained based on the ESP technology.

As shown in FIG. 8A and FIG. 8B, during specific encryption, a to-be-encrypted field, the padding data field, and the pad length field in the SRH standard header are encrypted together by using an encryption key and an encryption algorithm, so that each to-be-encrypted field in the SRH in FIG. 8A and FIG. 8B changes from plaintext to ciphertext.

It should be noted that FIG. 8A and FIG. 8B show an optional implementation of the extended TLV according to an embodiment of this application. A specific format of the extended TLV is not limited in this embodiment of this application.

Operation (3): The first edge node encapsulates the encrypted SRH into an outer layer of the service packet, then continues to encapsulate the IPv6 header into an outer layer of the SRH, to obtain the foregoing first packet, and sends the first packet.

After encrypting the SRH, the first edge node may obtain the first packet by performing the foregoing operation (3). The SID list in the SRH of the first packet obtained in this way is an encrypted SID list, so that exposure of the SID list to the network can be prevented.

In addition, the foregoing IPv6 header carries a destination IP address, and the destination IP address in the IPv6 header is an IP address corresponding to a next SID after an SID of the first edge node in the SID list.

In addition, before encapsulating the encrypted SRH into the outer layer of the service packet, the first edge node may further encrypt and encapsulate the service packet based on IPsec, to ensure security of the service packet.

Figure 9:
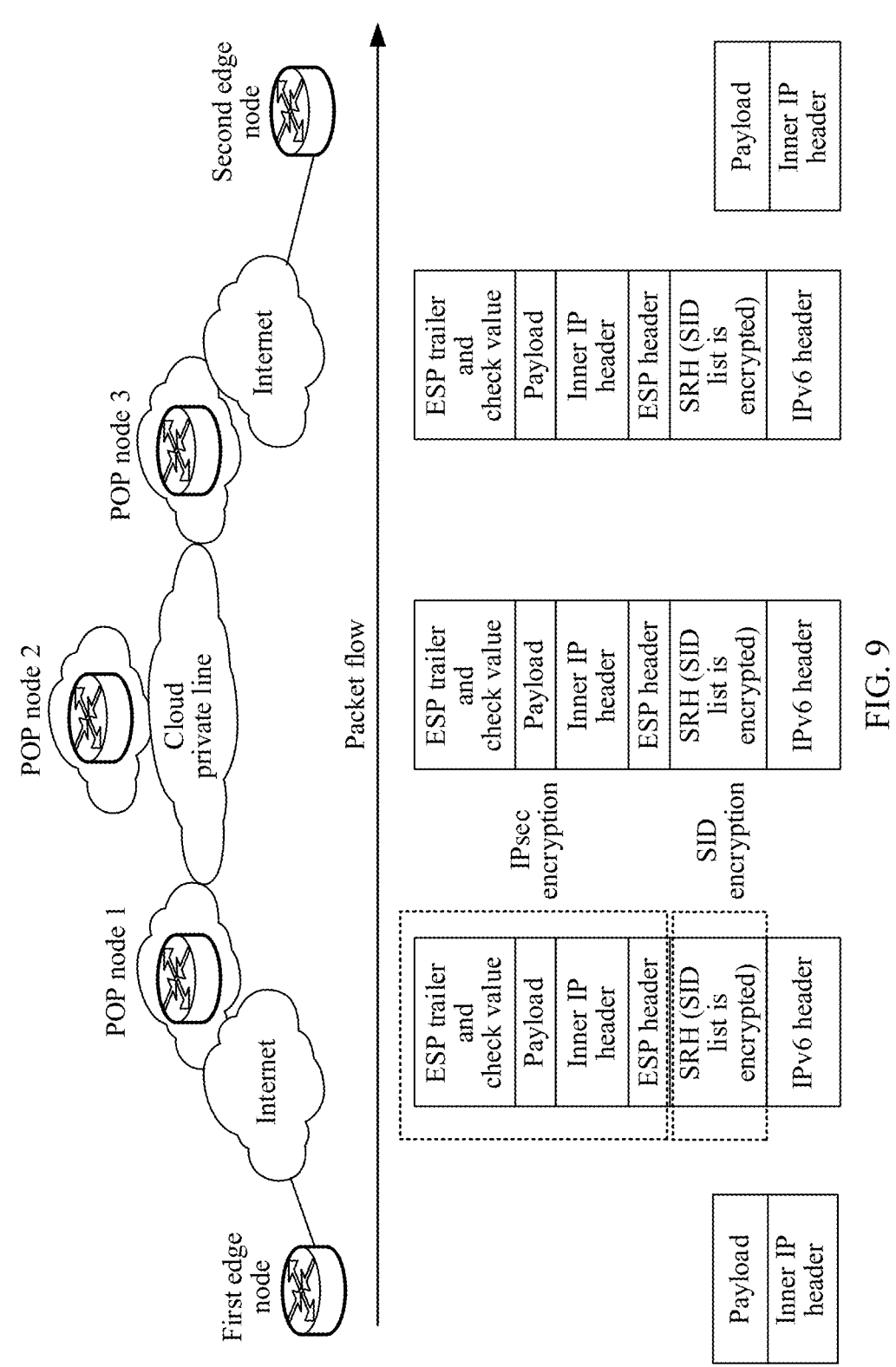
FIG. 9 is a schematic flowchart of sending a packet according to an embodiment of this application.

For example, FIG. 9 is a schematic flowchart of sending a packet according to an embodiment of this application. As shown in FIG. 9, a first edge node receives a service packet from a LAN side, where the service packet includes a payload and an inner IP header; and searches for a route based on a destination IP in the inner IP header to determine a tunnel interface IP of a second edge node, that is, a destination of the service packet. The first edge node determines, according to an SR path scheduling policy that is locally configured or delivered by a network controller in a centralized manner and based on the tunnel interface IP of the second edge node, an SID list in an SRH after packet encapsulation. The first edge node performs IPsec encryption and encapsulation on the service packet, where encapsulated content includes the inner IP header and the payload. The first edge node adds the SRH to the packet obtained after the IPsec encryption and encapsulation, and performs encryption and encapsulation on the SID list in the SRH. The first edge node further encapsulates an IPv6 header into the packet in which the SRH is encrypted, to obtain the foregoing first packet, and then forwards the first packet from a WAN interface to the POP network.

In addition, for the POP network shown in FIG. 2, when the first edge node receives the service packet sent by the local area network (LAN) side of the enterprise branch, the service packet may alternatively be encapsulated with the SRH. In this case, for the first edge node, the first edge node directly encrypts the SRH based on the foregoing encryption mechanism.

Operation 602: A second device receives the first packet.

After the first device sends the first packet, after receiving the first packet, any node in the network first determines, through comparison, whether an IPv6 address of the node is consistent with the destination IP address in the IPv6 header of the first packet. If the two are inconsistent, the node searches for a local route based on the destination IP address in the IPv6 header of the first packet, and then continues to forward the first packet based on the found route. If the two are consistent, the SRH needs to be decapsulated, and then subsequent processing is performed on the first packet according to the following operation 603 and operation 604.

For example, when the first device is the first edge node in the POP network shown in FIG. 2, the second device may be the second edge node or any POP node among the POP node 1, the POP node 2, and the POP node 3.

Operation 603: The second device decrypts the encrypted field, to obtain an SRH that does not include an encrypted field.

On an SRv6 network, when receiving a packet, an intermediate node needs to determine a current operation based on an SRH. Therefore, when receiving the first packet, the second device needs to first decrypt the encrypted field, so that the encrypted field in the SRH is changed from plaintext to ciphertext.

In some embodiments, when the unencrypted field in operation 601 includes the field indicating the index of the last SID in the SID list, an implementation process of operation 603 is as follows: The second device determines an end location of the SID list based on the field that is in the SRH and that indicates the index of the last SID in the SID list, the second device determines a start location of the SID list based on the IPv6 header, and the second device obtains the encrypted SID list based on the start location of the SID list and the end location of the SID list, to decrypt the SID list.

Because a format of the first eight bytes in the SRH is specified in a related standard, the second device may further determine the start location of the SID list after obtaining a start location of the SRH based on the IPv6 header.

In some other embodiments, when the unencrypted field in operation 601 includes the field indicating the index of the last SID in the SID list and the routing type field, an implementation process of operation 603 is as follows: The second device determines an end location of the SID list based on the field that is in the SRH and that indicates the index of the last SID in the SID list, the second device determines a start location of the SID list based on the routing type field, and the second device obtains the encrypted SID list based on the start location of the SID list and the end location of the SID list, to decrypt the SID list.

In some embodiments, when the unencrypted field in operation 601 includes the reserved flags field, and a value of the reserved flags field indicates whether the SID list is encrypted, if the value of the reserved flags field indicates that the SID list is encrypted, the second device performs, based on operation 603, the operation of decrypting the encrypted field. Correspondingly, if the value of the reserved flags field indicates that the SID list is not encrypted, the second device does not need to perform operation 603, and directly performs a next operation based on the unencrypted SRH.

In some embodiments, when the SRH in operation 601 includes the extended TLV, and the extended TLV carries the encryption metadata, because the encryption metadata is not encrypted, an implementation process in which the second device decrypts the encrypted field is as follows: The second device obtains the encryption metadata from the extended TLV, and decrypts the encrypted field based on the encryption metadata. Specifically, an encryption algorithm and a decryption key are determined based on the encryption metadata, and the encrypted field is decrypted based on the encryption algorithm and the decryption key.

It should be noted that the encryption algorithm used in this embodiment of this application may be a symmetric encryption algorithm. In this scenario, the encryption key used for encryption in operation 601 and the decryption key used for decryption in operation 603 are a same key. In an embodiment, the encryption algorithm may alternatively be an asymmetric encryption algorithm. In this scenario, the encryption key used for encryption in operation 601 is usually a public key, and the decryption key used for decryption in operation 603 is a private key. That is, the encryption key used for encryption and the decryption key used for decryption are a pair of public and private keys.

For example, when the foregoing encryption metadata is an ESP header in the ESP technology, the second device determines an SA based on an SPI in the ESP header, and decrypts the encrypted field based on an encryption algorithm and a decryption key that are specified by the SA.

In addition, in the foregoing scenario of obtaining the encryption metadata based on the extended TLV, in some embodiments, the unencrypted field further includes the header extension length field. In this case, the second device may determine a location of the TLV in the SRH based on the header extension length field and the field indicating the index of the last SID in the SID list, then obtain the foregoing extended TLV, and then obtain the encryption metadata.

In some embodiments, when the extended TLV in operation 601 includes the encryption flags field, and the encryption flags field indicates locations of the encrypted field and the unencrypted field in the SRH, before the second device decrypts the encrypted field, the second device first determines a location of the encrypted field in the SRH based on the encryption flags field, that is, determines which field in the SRH is encrypted.

In some embodiments, when the extended TLV in operation 601 further carries the padding data, an implementation process in which the second device decrypts the encrypted field is as follows: deleting the padding data from the decrypted field based on the padding data carried in the extended TLV, to obtain the SRH that does not include an encrypted field.

For example, when the extended TLV includes the padding data field and the pad length field, the second device deletes padding data having the same length as the padding data from the decrypted field, to obtain the SRH that does not include an encrypted field.

In some embodiments, when the extended TLV in operation 601 carries the integrity check value, the second device checks integrity of the SRH standard header (that is, the field before the SID list in the SRH and the SID list) based on the integrity check value before decrypting the encrypted field. When the integrity of the SRH standard header is not damaged, the operation of decrypting the encrypted field is performed.

For example, when the foregoing encryption metadata is the ESP header in the ESP technology, the second device determines the SA based on the SPI in the ESP header, calculates a digest value of the SRH standard header according to a digest algorithm and a check key that are specified by the SA, and then compares the digest value with the integrity check value. If the two are consistent, it indicates that the integrity of the SRH standard header is not damaged, and the encrypted field is decrypted. Correspondingly, if the two are inconsistent, it indicates that the SRH standard header has been changed. In this case, another operation needs to be performed, which is not described in detail herein.

It can be learned from the function description of the integrity check value in operation 601 that the integrity check value may be at least used to check integrity of the SRH standard header. For an integrity check value in any scenario, integrity check may be performed with reference to the foregoing embodiment, and examples are not described one by one herein again.

In some other embodiments, if an integrity check mark field is extended in the SRH in operation 601, a value of the integrity check mark field can indicate integrity of a part that the integrity check value is used to check. In this case, the second device first determines, based on the integrity check mark field, a field on which integrity check needs to be performed, and then checks integrity of the field based on the integrity check value.

Operation 604: The second device processes the first packet based on the SRH that does not include an encrypted field.

In some embodiments, after obtaining the SRH that does not include an encrypted field, the second device may determine the last SID in the SID list, where the last SID is the IPv6 address of the destination of the payload. The second device compares the IPv6 address with an IPv6 address of the second device. If the two are consistent, the second device determines that the second device is the destination of the payload. If the two are inconsistent, it indicates that the second device is not the destination of the payload.

When the second device determines, based on the SRH that does not include an encrypted field, that the second device is not the destination of the payload, it indicates that the second device is still an intermediate node on the forwarding path indicated by the SID list. Therefore, the second device needs to modify the SL field in the SRH, for example, subtract 1 from the SL value, and then generate a second packet based on the modified SRH, where the second packet includes the modified SRH and the payload. Specifically, the modified SRH is encapsulated in the inner packet of the first packet (that is, the foregoing service packet includes the inner IP header and the payload), and the IPv6 header continues to be encapsulated, where a destination address carried in the IPv6 header is an IPv6 address corresponding to a next SID of the SID of the second device in the SID list, so that the second packet is obtained, and then the second packet is sent.

In an embodiment, in this embodiment of this application, the second device may further first encrypt the modified SRH, then encapsulate the encrypted modified SRH into the inner packet header of the first packet, then continue to encapsulate the IPv6 header to obtain the second packet, and then send the second packet. In this case, the SRH of the second packet also includes an encrypted field and an unencrypted field. For encrypting the modified SRH by the second device, refer to operation 601, and details are not described herein again. That is, for related explanations of the encrypted field and the unencrypted field in the SRH of the second packet, refer to operation 601. Details are not described herein again.

For example, when determining that there is a private line between the second device and the next hop of the packet, the second device does not encrypt the modified SRH; or when there is no private line between the second device and the next hop of the packet, the second device encrypts the modified SRH. It should be noted that in this embodiment of this application, the second device may directly encrypt the modified SRH without distinguishing between cases.

After the second device sends the second packet, a processing process of a subsequent node is the same as the processing process of the second device for the first packet, and details are not described herein again.

Further, in operation 604, if the second device determines that the second device is the destination of the payload, the second device extracts the SRH in the first packet to obtain the service packet, and then continues subsequent processing based on the destination IP address carried in the service packet.

The following still uses FIG. 9 as an example to describe the foregoing operation 602 to operation 604.

As shown in FIG. 9, after receiving the encrypted packet (that is, the foregoing first packet) from an internet WAN interface, any POP node parses the IPv6 header, and determines, from a "next header" field in the IPv6 header, that a next packet header is the SRH header. The POP node parses the SRH, and performs a decryption operation on the encrypted field that includes the SID list in the SRH. The POP node obtains the SID list, determines a next hop, where the next hop is a POP node or the second edge node, and modifies an SL value. The POP node performs header encryption on the modified SRH. The POP node encapsulates the IPv6 header with a source IP address unchanged and a destination IP address as a next-hop address, and forwards the packet to the next hop.

It should be noted that if the next hop of the POP node is a destination edge node (that is, the second edge node), the SRH header may directly pop up, and then the packet is forwarded. The POP node determines whether to enable SRH header encryption as required. If there is a private line between the POP node and the next-hop POP node, encryption is not required.

When receiving the encrypted packet from a WAN interface, the second edge node parses the IPv6 header, and determines, from the "next header" field in the IPv6 header, that a next packet header is the SRH. The second edge node parses the SRH, and performs a decryption operation on the encrypted field in the SRH header. The second edge node obtains the SID list, determines that the second edge node is the destination node, and performs inner IPsec decryption on the packet. The second edge node completes IPsec decryption, and obtains the destination IP address and the payload of the service packet. The second edge node looks up a routing table based on the destination IP address of the service packet and forwards the service packet to an LAN-side intranet device.

In conclusion, the embodiment shown in FIG. 5 provides an SRH header encryption mechanism. The SRH header encryption mechanism encrypts at least the SID list. The SRH header encryption mechanism is established between the edge node and the POP node based on the internet. If the internet is used for transmission between POP nodes, the SRH header encryption mechanism is also established. If a private line network is used for transmission, SRH header encryption is not required. Based on this encryption mechanism, an SID list in an SRH of an SRv6 packet transmitted over the POP network is encrypted to protect the SID information in the SRH header from being leaked. In addition, end-to-end encryption of the POP network is implemented, and an intermediate POP node does not decrypt the payload, so that forwarding efficiency of the intermediate POP node is high. In addition, a secure check mechanism for a packet received by a POP node on the internet is further provided.

FIG. 10 is a flowchart of another packet sending method according to an embodiment of this application. The method is used to explain and describe the second SRH encryption mechanism provided in embodiments of this application. The entire SRH is encrypted in the second SRH encryption mechanism. As shown in FIG. 10, the method includes the following operations.

Operation 1001: A first device sends a first packet, where the first packet includes a first encrypted part, a segment routing header SRH of the first packet is in the first encrypted part, and a payload of the first packet is not in the first encrypted part.

To prevent an SID list in the SRH from being exposed to a network, the SID list needs to be encrypted. To prevent the payload from being attacked subsequently, the payload is encrypted and encapsulated based on IPsec. In this case, to ensure that a subsequent node does not decrypt the payload when decrypting the SRH, the SRH and the payload need to be encrypted differently. Therefore, the first encrypted part of the first packet in operation 1001 includes the SRH but does not include the payload. In addition, the payload encrypted and encapsulated based on IPsec is referred to as a second encrypted part.

In this embodiment of this application, a new packet header is extended. The new packet header includes an overall encrypted SRH, to prevent the SID list from being exposed to a network. Therefore, in some embodiments, the first packet includes the extension packet header, and the foregoing first encrypted part is carried in the extension packet header.

In this scenario, an implementation process of operation 1001 is as follows: In a process of encapsulating the first packet, the first device separately encrypts the SRH of the first packet, and encapsulates the separately encrypted SRH in an extension packet header manner, to obtain the first packet. The following describes operation 1001 in detail by using an example in which the first device is the first edge node in the POP network shown in FIG. 2, and a destination of the payload of the first packet is the second edge node.

For the network shown in FIG. 2, in some embodiments, an implementation process of operation 1001 may be implemented by using the following operations.

Operation (1): The first edge node receives a service packet sent by a local area network (LAN) side of the enterprise branch.

For an implementation of operation (1), refer to operation 501 in the embodiment shown in FIG. 5. Details are not described herein again.

Operation (2): The first edge node generates an SRH, and encrypts the entire SRH.

The first edge node determines a forwarding path based on a destination IP address in an inner IP header of the service packet. Then, an SID list is determined based on the forwarding path, and the SRH is generated. For a specific implementation, refer to operation 501 in the embodiment shown in FIG. 5. Details are not described herein again.

Figure 11:
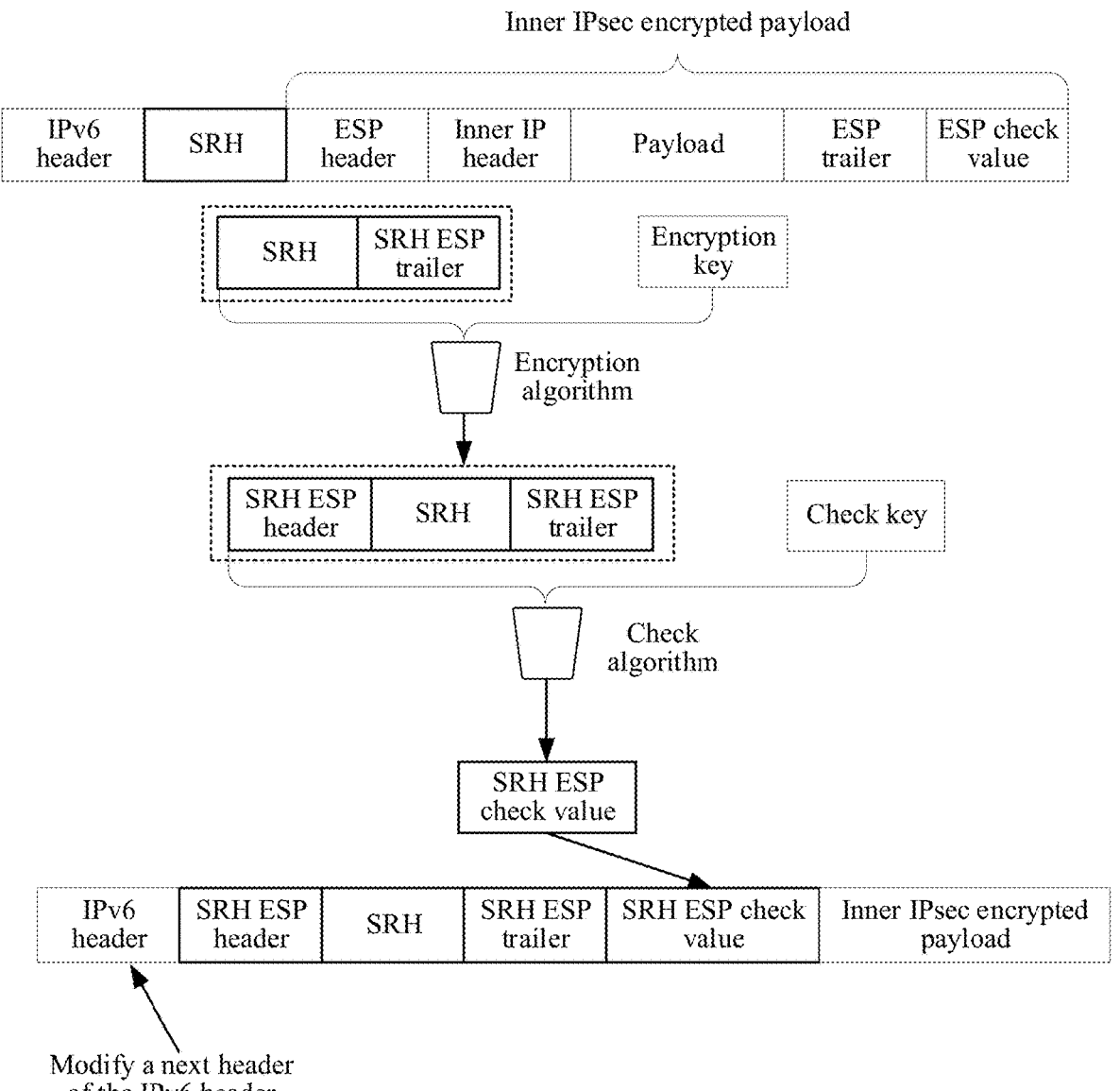
FIG. 11 is a schematic diagram of another encryption technology according to an embodiment of this application.

After the SRH is generated, the SRH may be encrypted based on an encryption technology. FIG. 11 is a schematic diagram of another encryption technology according to an embodiment of this application. In FIG. 11, an SRH is encrypted by using an encapsulating security payload (ESP) encryption technology. As shown in FIG. 11, a basic principle of the ESP encryption technology is as follows: The SRH and an ESP trailer are encrypted together by using an encryption key and an encryption algorithm, to obtain the first encrypted part. Because the SRH is currently being encrypted, to facilitate subsequent differentiation from another ESP technology, the ESP trailer used for SRH encryption in FIG. 11 and subsequently is referred to as an SRH ESP trailer. After the SRH is encrypted, encrypted content may be used as the first encrypted part, and the first edge node encapsulates the first encrypted part into the extension packet header. Then, an integrity check value (ICV) is obtained by using a check algorithm and a check key for the extension packet header together with an ESP header. The integrity check value is an SRH check result. Subsequently, another node may first check integrity of the extension packet header based on the integrity check value, and then decrypt the first encrypted part after the integrity check succeeds, to obtain an unencrypted SRH. Similarly, to facilitate subsequent differentiation from another ESP technology, in FIG. 11 and subsequently, the ESP header used for SRH encryption is referred to as an SRH ESP header, and the integrity check value generated based on the SRH is referred to as an SRH ESP check value.

Similar to the embodiment shown in FIG. 6, the SRH ESP trailer includes padding data (Padding) and a pad length. The SRH ESP header includes two parts: a security parameter index (SPI) and a sequence number. For related content, refer to the embodiment shown in FIG. 6, and details are not described herein again.

It should be noted that the ESP encryption technology is also an optional encryption implementation in this embodiment of this application, and any encryption technology may be used to encrypt a to-be-encrypted field in the SRH.

In addition, like the embodiment shown in FIG. 6, in addition to the foregoing encryption on the SRH in the first packet, IPsec encryption and encapsulation may be further performed on the service packet, as shown in FIG. 11. After being encrypted and encapsulated based on IPsec, the service packet includes the ESP header, the inner IP header, the payload, the ESP trailer, and the ESP check value. For related explanations of the ESP header, the ESP trailer, and the ESP check value in the service packet obtained after IPsec encryption and encapsulation, refer to the foregoing related explanations of performing ESP encryption on the SRH, and details are not described herein again.

In addition, after the SRH is encrypted, the integrity check value for the encrypted field may not be generated. In this way, only the SRH needs to be decrypted subsequently, and integrity check does not need to be performed on the SRH.

In addition, after the first encrypted part is obtained through encryption, some information used in the encryption process may be added to the packet, so that another node subsequently decrypts, or decrypts and checks the first encrypted part based on the information. In an embodiment, if all nodes in the network agree in advance to use a unified encryption and checking technology, the information used in the encryption process does not need to be added to the packet, and other nodes may process the first encrypted part based on the agreed encryption and checking technology. The information used in the foregoing process of encrypting the SRH is referred to as encryption metadata.

For example, when the new extension packet header is extended, the extension packet header further carries the encryption metadata. The first encrypted part is encrypted based on the encryption metadata, and it needs to be ensured that the encryption metadata is not encrypted, so that another node subsequently processes the encrypted field in the SRH based on the encryption metadata. In other words, the encryption metadata is not in the first encrypted part. For example, the encryption metadata includes the SRH ESP header in the foregoing ESP technology.

The encryption metadata is carried in an extension packet header. In an embodiment, the encryption metadata may alternatively be carried in another field of the first packet, provided that the encryption metadata is not in the first encrypted part.

For another example, in the foregoing scenario of encryption based on the ESP technology, the extension packet header further carries padding data. As can be learned from the foregoing ESP encryption technology principle, in this case, the first encrypted part further includes encrypted padding data.

For another example, when an integrity check value is further determined for the extension packet header, the extension packet header further carries the integrity check value, and the integrity check value is used to check integrity of the extension packet header. Because the extension packet header carries the SRH, integrity check on the SRH is implemented through integrity check on the extension packet header.

It should be noted that, for the integrity check provided in this embodiment of this application, integrity check may be performed on only the extension packet header, or integrity check may be performed on both the extension packet header and the IPv6 header. In other words, the integrity check value carried in the first packet is used to perform integrity check on at least the extension packet header.

In a scenario in which integrity check is performed on only the extension packet header, the integrity check value carried in the extension packet header is generated based on only the extension packet header. In a scenario in which integrity check is performed on both the extension packet header and the IPv6 header, the integrity check value carried in the extension packet header is generated based on the extension packet header and the IPv6 header.

Based on the foregoing scenario, a type field of the extension packet header may be further extended. When a value of the extended type field is a first value, it indicates that the integrity check value is used to check integrity of the extension packet header and the IPv6 header of the first packet. When the type field of the extension packet header is a second value, it indicates that the integrity check value is used to check integrity of the extension packet header.

Figure 12:
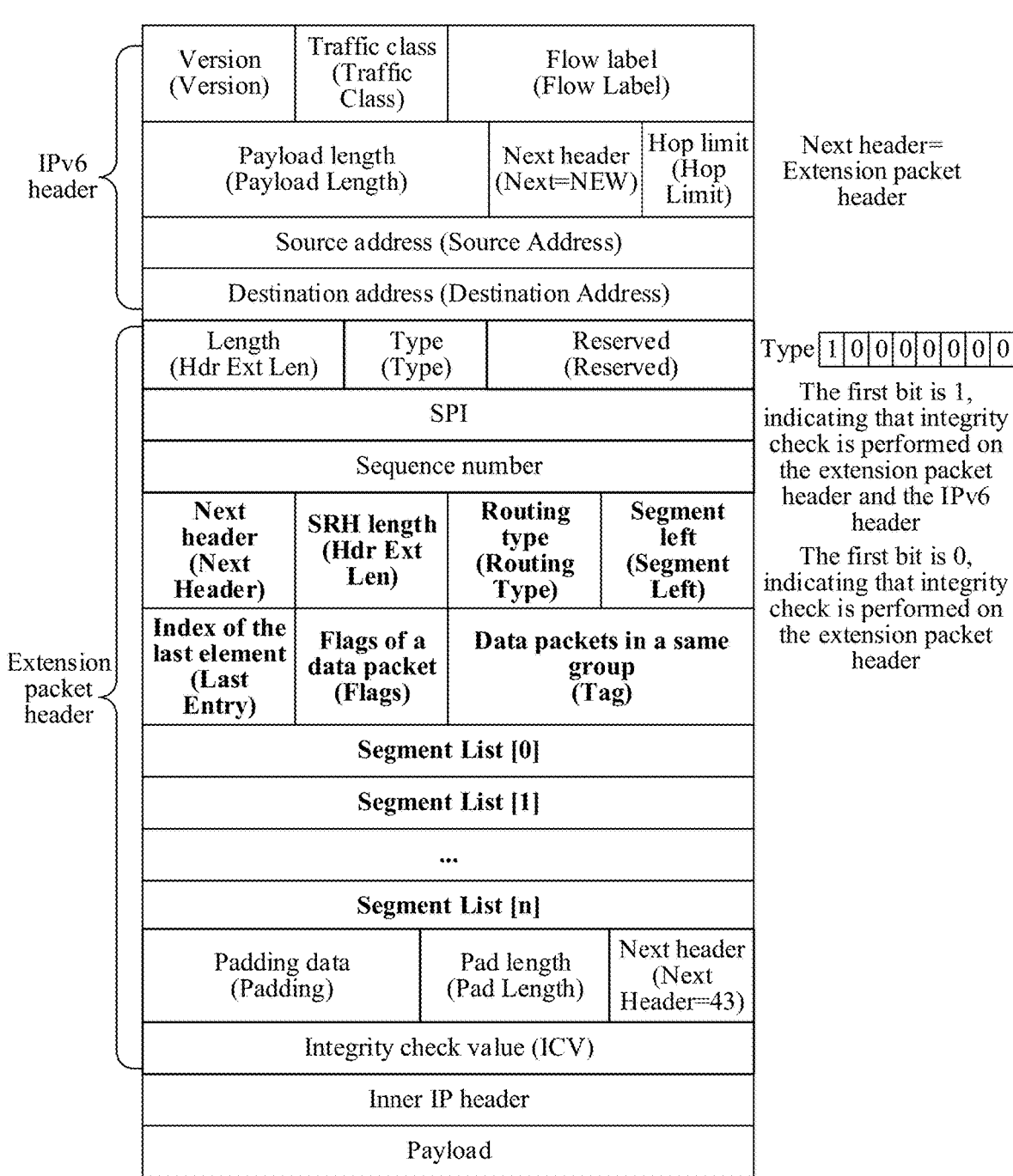
FIG. 12 is a schematic diagram of a format of another first packet according to an embodiment of this application.

FIG. 12 is a schematic diagram of a format of another first packet according to an embodiment of this application. As shown in FIG. 12, the first packet includes an IPv6 header, an extension packet header, an inner IP header, and a payload. For explanations of fields in the IPv6 header and the inner IP header, refer to the foregoing related content, and details are not described herein again.

As shown in FIG. 12, the extension packet header includes a header extension length (Hdr Ext Len) field, a type (Type) field, a reserved (Reserved) field, an SPI field, a sequence number field, a first encrypted part (in bold in FIG. 12), and an ICV field. The first encrypted part includes an encrypted SRH, an encrypted padding data field, and a pad length field.

For related explanations of fields in the SRH in FIG. 12, refer to the embodiment shown in FIG. 6. Details are not described herein again.

The type field in the first row of the extension packet header includes eight bits, and when a value of the first bit is 0, it indicates that integrity check is subsequently performed on only the extension packet header. If the bit is 1, integrity check is performed on both the extension packet header and the IPv6 header.

In addition, in the SRv6 protocol, a value of the next header in the IPv6 header indicates that the next header is the SRH. However, as shown in FIG. 12, in this embodiment of this application, a value of the next header in the IPv6 header indicates that the next header is the extension packet header.

The SPI field and the sequence number field are respectively used to carry an SPI and a sequence number in the foregoing SRH ESP header. The padding data field and the pad length field are respectively used to carry padding data and a pad length in the foregoing SRH ESP trailer. The integrity check value field is used to carry the ICV obtained based on the ESP technology.

As shown in FIG. 12, during specific encryption, the SRH field, the padding data field, and the pad length field are encrypted together by using an encryption key and an encryption algorithm, so that the entire SRH in FIG. 12 is changed from plaintext to ciphertext.

In addition, as shown in FIG. 12, during specific encryption, the next header field in the extension packet header is also encrypted. In an embodiment, this field may not be encrypted. Accordingly, the next header field is not in the first encrypted part.

The extension packet header in FIG. 12 still uses a basic format of the ESP header. In this scenario, the extension packet header may also be referred to as an SRH ESP header. It should be noted that FIG. 12 shows an optional implementation of an extension packet header according to an embodiment of this application. A specific format of the extension packet header is not limited in this embodiment of this application.

Operation (3): The first edge node encapsulates the first encrypted part into an outer layer of the service packet, then continues to encapsulate the IPv6 header to obtain the foregoing first packet, and then sends the first packet.

After encrypting the SRH, the first edge node may obtain the first packet by performing the foregoing operation (3). The SRH of the first packet obtained in this way is in the first encrypted part, so that exposure of the SID list to the network can be avoided.

For example, when the extension packet header is extended, the first edge node may encapsulate the extension packet header including the first encrypted part into the outer layer of the service packet, and then continue to encapsulate the IPv6 header into an outer layer of the extension packet header, to obtain the foregoing first packet.

In addition, the foregoing IPv6 header carries a destination IP address, and the destination IP address in the IPv6 header is an IP address corresponding to a next SID after an SID of the first edge node in the SID list.

In addition, before encapsulating the encrypted SRH into the outer layer of the service packet, the first edge node may further encrypt and encapsulate the service packet based on IPsec, to ensure security of the service packet.

Figure 13:
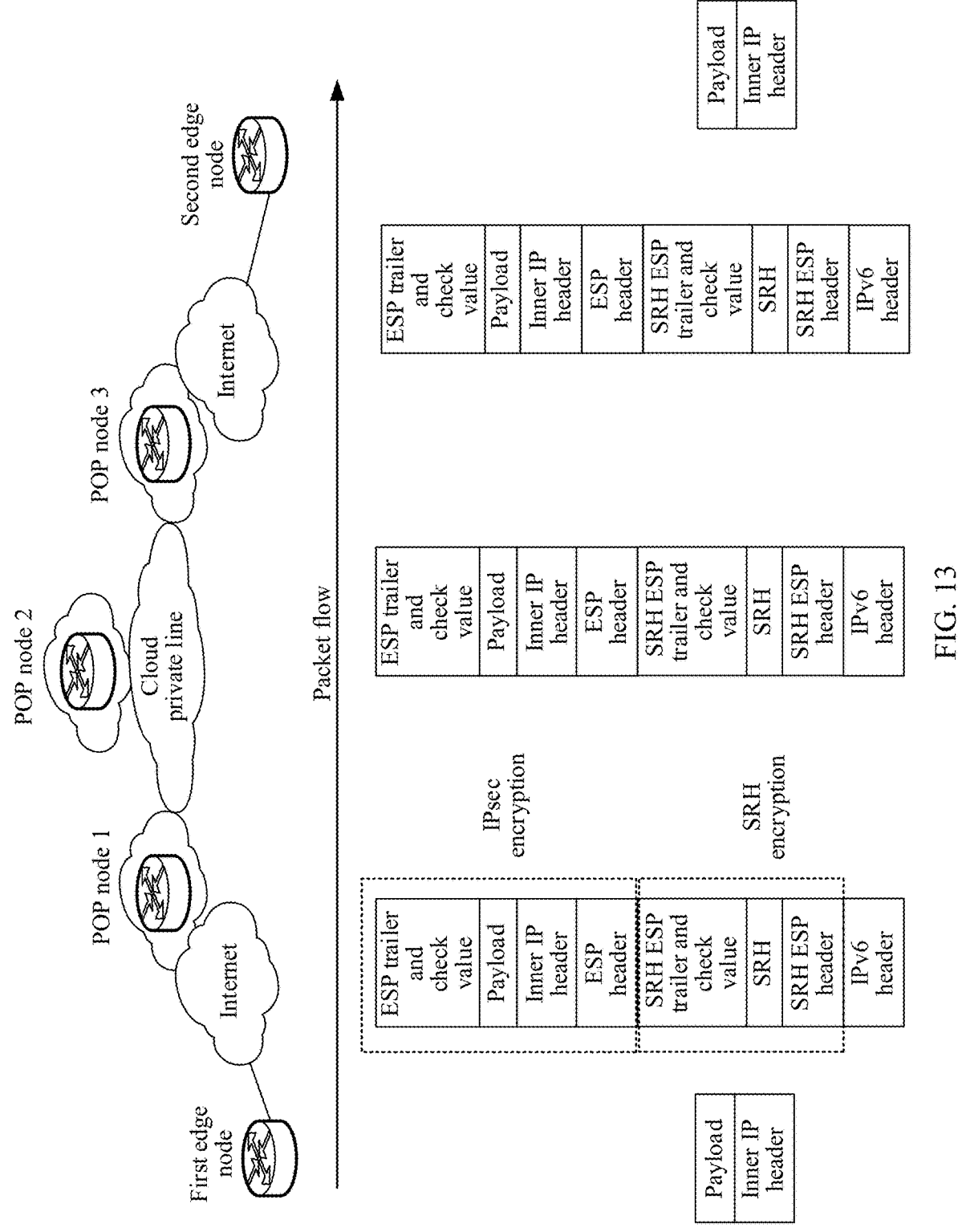
FIG. 13 is a schematic flowchart of sending a packet according to an embodiment of this application.

For example, FIG. 13 is a schematic flowchart of sending a packet according to an embodiment of this application. As shown in FIG. 13, a first edge node receives a service packet from a LAN side, searches for a route based on a destination IP address of the service packet, and determines a tunnel interface IP address of a second edge node, that is, a destination of the service packet. The first edge node determines, according to an SR path scheduling policy that is locally configured or delivered by a network controller in a centralized manner, an SID list of an SRH to be encapsulated outside the service packet. The first edge node performs IPsec encryption and encapsulation on the service packet, where encapsulated content includes an inner IP header and a payload in the service packet. The first edge node adds an extension packet header to the packet obtained after IPsec encryption and encapsulation, where the extension packet header includes the SRH that is separately encrypted. After encapsulating the extension packet header into an outer layer of the service packet, the first edge node continues to encapsulate an IPv6 header, where a "next header" field in the IPv6 header is a type of an extension packet header, to obtain the first packet. Then, the first packet is forwarded to a POP network through an outbound interface.

In addition, for the POP network shown in FIG. 2, when the first edge node receives the service packet sent by the local area network (LAN) side of the enterprise branch, the service packet may alternatively be encapsulated with the SRH. In this case, for the first edge node, the first edge node directly encrypts the SRH based on the foregoing encryption mechanism.

Operation 1002: A second device receives the first packet.

For an implementation of operation 1002, refer to the implementation of operation 602 in the embodiment in FIG. 6. Details are not described herein again.

Operation 1003: The second device decrypts the first encrypted part to obtain the SRH.

On an SRv6 network, when receiving a packet, an intermediate node needs to determine a current operation based on an SRH. Therefore, when receiving the first packet, the second device needs to first decrypt the first encrypted part, to obtain the SRH that does not include ciphertext information.

In some embodiments, in operation 1001, when the first packet includes the extension packet header, and the first encrypted part is carried in the extension packet header, the second device first obtains the extension packet header, then obtains the first encrypted part from the extension packet header, and then decrypts the first encrypted part to obtain the SRH.

For example, when the next header field in the IPv6 header in operation 1001 indicates that the next header is the extension packet header, the extension packet header may be obtained based on a location of the next header field in the IPv6 header.

In some embodiments, when the extension packet header in operation 1001 carries the encryption metadata, because the encryption metadata is not encrypted, an implementation process in which the second device decrypts the first encrypted part is as follows: The second device obtains the encryption metadata from the extension packet header, and decrypts the encrypted field based on the encryption metadata. Specifically, an encryption algorithm and a decryption key are determined based on the encryption metadata, and the encrypted field is decrypted based on the encryption algorithm and the decryption key. For a specific implementation, refer to operation 603 in the embodiment in FIG. 6.

In some embodiments, when the extension packet header in operation 1001 further carries the padding data, an implementation process in which the second device decrypts the first encrypted part is as follows: deleting the padding data from a decrypted field to obtain the SRH.

For example, when the extension packet header includes the padding data field and the pad length field, the second device deletes padding data having the same length as the padding data from the decrypted field, to obtain an unencrypted SRH.

In some embodiments, when the extension packet header in operation 1001 carries the integrity check value, before decrypting the first encrypted part, the second device first checks integrity of the extension packet header based on the integrity check value. When the integrity of the extension packet header is not damaged, the operation of decrypting the first encrypted part is performed. For a specific check manner, refer to operation 603 in the embodiment in FIG. 6.

For example, when the type field in the extension packet header in operation 1001 is extended, an implementation process of checking integrity of the extension packet header is as follows: when the type field in the extension packet header is the first value, performing integrity check on the extension packet header and the IPv6 header of the first packet based on the integrity check value; or when the type field in the extension packet header is the second value, performing integrity check on the extension packet header based on the integrity check value.

Operation 1004: The second device processes the first packet based on the SRH.

In some embodiments, after obtaining the SRH, the second device may determine the last SID from the SID list, where the last SID is the IPv6 address of the destination of the payload. The second device compares the IPv6 address with an IPv6 address of the second device. If the two are consistent, the second device determines that the second device is the destination of the payload. If the two are inconsistent, it indicates that the second device is not the destination of the payload.

When the second device determines, based on the SRH, that the second device is not the destination of the payload, it indicates that the second device is still an intermediate node on the forwarding path indicated by the SID list. Therefore, the second device needs to modify the SL field in the SRH. For example, 1 is subtracted from the SL value. Then, a second packet is generated based on the modified SRH, where the second packet includes the modified SRH and the payload. Specifically, the modified SRH is encapsulated in the inner packet of the first packet (that is, the foregoing service packet includes the inner IP header and the payload), and the IPv6 header continues to be encapsulated, where a destination address carried in the IPv6 header is an IPv6 address corresponding to a next SID of the SID of the second device in the SID list, so that the second packet is obtained, and then the second packet is sent. In other words, the second device modifies the SRH based on the next hop of the payload, and generates the second packet based on the modified SRH, where the second packet includes the modified SRH and the payload.

In an embodiment, in this embodiment of this application, the second device may further first encrypt the modified SRH, then encapsulate the encrypted modified SRH into the inner packet header of the first packet, then continue to encapsulate the IPv6 header to obtain the second packet, and then send the second packet. In this case, the SRH in the second packet includes the first encrypted part. For encrypting the modified SRH by the second device, refer to operation 1001, and details are not described herein again. That is, for a related explanation of the first encrypted part in the SRH of the second packet, refer to operation 1001. Details are not described herein again.

For example, when determining that there is a private line between the second device and the next hop of the packet, the second device does not encrypt the modified SRH; or when there is no private line between the second device and the next hop of the packet, the second device encrypts the modified SRH. It should be noted that in this embodiment of this application, the second device may directly encrypt the modified SRH without distinguishing between cases.

After the second device sends the second packet, a processing process of a subsequent node is the same as the processing process of the second device for the first packet, and details are not described herein again.

Further, in operation 604, if the second device determines that the second device is the destination of the payload, the second device extracts the SRH in the first packet to obtain the service packet, and then continues subsequent processing based on the destination IP address carried in the service packet.

The following still uses FIG. 13 as an example to describe the foregoing operation 1002 to operation 1004.

As shown in FIG. 13, after receiving the encrypted packet (that is, the foregoing first packet) from an internet WAN interface, any POP node parses the IPv6 header, and determines, from a "next header" field in the IPv6 header, that a next packet header is the SRH ESP header. The POP node checks and decrypts the SRH based on information in the SRH ESP header, and parses plaintext information in the SRH. The POP node obtains the SID list from the decrypted SRH, determines a next hop, where the next hop is a POP node or the second edge node, and modifies SID pointer information (SL) in the SRH. The POP node performs header encryption on the SRH, and encapsulates the encrypted SRH into the SRH ESP header. The POP node continues to encapsulate the IPv6 header outside the SRH ESP header, where the source IP address remains unchanged, and the destination IP address is an IP address of the next hop. The POP node forwards the packet to the next hop.

It should be noted that if the next hop of the POP node is a destination edge node (that is, the second edge node), the SRH header may directly pop up, and then the packet is forwarded. The POP node determines whether to enable SRH header encryption as required. If there is a private line between the POP node and the next-hop POP node, encryption is not required.

When receiving the encrypted packet from a WAN interface, the second edge node parses the IPv6 header, and determines, from the "next header" field in the IPv6 header, that a next packet header is the SRH ESP header. The second edge node checks and decrypts the SRH based on the SRH ESP header, and parses the plaintext information in the SRH.

The second edge node obtains the SID list from the decrypted SRH, determines that the second edge node is the destination node, and performs inner IPsec decryption on the packet. The second edge node completes IPsec decryption, and obtains the destination IP address and the payload of the service packet. The second edge node looks up a routing table based on the destination IP address of the service packet and forwards the service packet to an LAN-side intranet device.

The embodiment shown in FIG. 10 provides an SRH header encryption mechanism. The SRH header encryption mechanism encrypts the entire SRH. The SRH header encryption mechanism is established between the edge node and the POP node based on the internet. If the internet is used for transmission between POP nodes, the SRH header encryption mechanism is also established. If a private line network is used for transmission, SRH header encryption is not required. Based on this encryption mechanism, an SRH in an SRv6 packet transmitted over the POP network is encrypted to protect SID information in the SRH header from being leaked. In addition, end-to-end encryption of the POP network is implemented, and an intermediate POP node does not decrypt the payload, so that forwarding efficiency of the intermediate POP node is high. In addition, a secure check mechanism for a packet received by a POP node on the internet is further provided.

Figure 14:
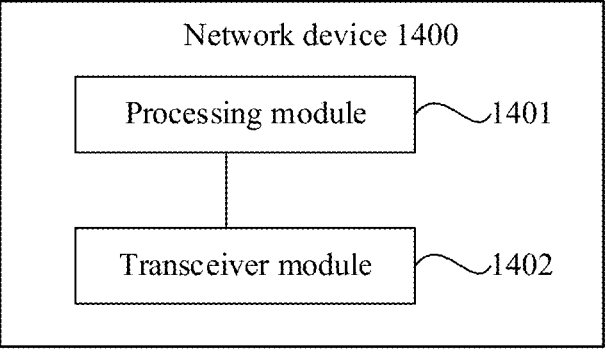
FIG. 14 is a schematic diagram of a structure of a network device according to an embodiment of this application.

FIG. 14 is a schematic diagram of a structure of a network device according to an embodiment of this application. As shown in FIG. 14, the network device 1400 includes a processing module 1401 and a transceiver module 1402.

The processing module 1401 is configured to encrypt a segment routing header SRH in a packet, where the packet further includes a payload, the encrypted SRH includes an encrypted field and an unencrypted field, the encrypted field includes at least an encrypted segment identifier SID list, and the SID list indicates a transmission path of the packet. For a specific implementation, refer to operation 601 in the embodiment in FIG. 6.

The transceiver module 1402 is configured to send the packet. For a specific implementation, refer to operation 601 in the embodiment in FIG. 6.

In an embodiment, the unencrypted field includes a field indicating an index of a last SID in the SID list.

In an embodiment, the unencrypted field further includes a routing type field.

In an embodiment, the unencrypted field further includes a reserved flags field, and a value of the reserved flags field indicates that the SID list has been encrypted.

In an embodiment, the SRH includes an extended type-length-value TLV, the extended TLV carries encryption metadata, the encrypted field is encrypted based on the encryption metadata, and the encryption metadata is not encrypted.

In an embodiment, the unencrypted field further includes a header extension length field.

In an embodiment, the extended TLV includes an encryption flags field, and values of the encryption flags field indicate locations of the encrypted field and the unencrypted field in the SRH.

In an embodiment, the encrypted field further includes encrypted padding data, and the extended TLV further carries the encrypted padding data.

In an embodiment, the extended TLV further carries an integrity check value, and the integrity check value is at least used to check integrity of the SID list and a field before the SID list in the SRH.

In conclusion, the embodiment of this application provides an SRH header encryption mechanism. The SRH header encryption mechanism encrypts at least the SID list. The SRH header encryption mechanism is established between the edge node and the POP node based on the internet. If the internet is used for transmission between POP nodes, the SRH header encryption mechanism is also established. If a private line network is used for transmission, SRH header encryption is not required. Based on this encryption mechanism, an SID list in an SRH of an SRv6 packet transmitted over the POP network is encrypted to protect the SID information in the SRH header from being leaked. In addition, end-to-end encryption of the POP network is implemented, and an intermediate POP node does not decrypt the payload, so that forwarding efficiency of the intermediate POP node is high. In addition, a secure check mechanism for a packet received by a POP node on the internet is further provided.

In some other embodiments, the processing module and the transceiver module in the network device shown in FIG. 14 have the following functions.

The processing module 1401 is configured to encrypt a packet, where the encrypted packet includes an encrypted part, a segment routing header SRH of the packet is in the encrypted part, and a payload of the packet is not in the encrypted part. For a specific implementation, refer to operation 1001 in the embodiment in FIG. 10.

The transceiver module 1402 is configured to send the packet. For a specific implementation, refer to operation 1001 in the embodiment in FIG. 10.

In an embodiment, the packet includes an extension packet header, and the encrypted part is carried in the extension packet header.

In an embodiment, the extension packet header further carries encryption metadata, the encrypted part is encrypted based on the encryption metadata, and the encryption metadata is not in the encrypted part.

In an embodiment, the extension packet header further carries an integrity check value, and the integrity check value is at least used to check integrity of the extension packet header.

In an embodiment, when a value of a type field of the extension packet header is a first value, the integrity check value is used to check integrity of the extension packet header and an IPv6 header of the first packet; or when the value of the type field of the extension packet header is a second value, the integrity check value is used to check integrity of the extension packet header.

In an embodiment, the IPv6 header of the packet is located at an outer layer of the extension packet header, and a next header field in the IPv6 header indicates that a next packet header is the extension packet header.

In an embodiment, the encrypted part further includes encrypted padding data.

In conclusion, the embodiment of this application provides an SRH header encryption mechanism. The SRH header encryption mechanism encrypts the entire SRH. The SRH header encryption mechanism is established between the edge node and the POP node based on the internet. If the internet is used for transmission between POP nodes, the SRH header encryption mechanism is also established. If a private line network is used for transmission, SRH header encryption is not required. Based on this encryption mechanism, an SRH in an SRv6 packet transmitted over the POP network is encrypted to protect SID information in the SRH header from being leaked. In addition, end-to-end encryption of the POP network is implemented, and an intermediate POP node does not decrypt the payload, so that forwarding efficiency of the intermediate POP node is high. In addition, a secure check mechanism for a packet received by a POP node on the internet is further provided.

In some other embodiments, the processing module and the transceiver module in the network device shown in FIG. 14 have the following functions.

The transceiver module 1402 is configured to receive a first packet, where the first packet includes a segment routing header SRH and a payload, the SRH includes an encrypted field and an unencrypted field, the encrypted field includes at least an encrypted segment identifier SID list, and the SID list indicates a transmission path of the first packet. For a specific implementation, refer to operation 602 in the embodiment in FIG. 6.

The processing module 1401 is configured to decrypt the encrypted field to obtain an SRH that does not include an encrypted field. For a specific implementation, refer to operation 603 in the embodiment in FIG. 6.

The processing module 1401 is further configured to process the first packet based on the SRH that does not include an encrypted field. For a specific implementation, refer to operation 604 in the embodiment in FIG. 6.

In an embodiment, the processing module is configured to: when determining, based on the SRH that does not include an encrypted field, that the network device is not a destination of the payload, modify, based on a next hop of the payload, the SRH that does not include an encrypted field, and generate a second packet based on a modified SRH, where the second packet includes the modified SRH and the payload.

The transceiver module is further configured to send the second packet.

In an embodiment, the processing module is further configured to:

encrypt the modified SRH, where correspondingly, the SRH in the second packet includes the encrypted field and the unencrypted field.

In an embodiment, the unencrypted field includes a field indicating an index of a last SID in the SID.

The processing module is configured to:

determine an end location of the SID list based on the field that is in the SRH and that indicates the index of the last SID in the SID list;

determine a start location of the SID list based on an IPv6 header of the first packet; and determine and obtain the encrypted SID list based on the start location and the end location of the SID list, to decrypt the encrypted SID list.

In an embodiment, the unencrypted field includes a field indicating an index of a last SID in the SID list and a routing type field.

The processing module is configured to:

determine an end location of the SID list based on the field that is in the SRH and that indicates the index of the last SID in the SID list;

determine a start location of the SID list based on the routing type field; and determine and obtain the encrypted SID list based on the start location and the end location of the SID list, to decrypt the encrypted SID list.

In an embodiment, the unencrypted field further includes a reserved flags field.

The processing module is configured to:

when a value of the reserved flags field indicates that the SID list has been encrypted, perform an operation of decrypting the encrypted field.

In an embodiment, the SRH includes an extended type-length-value TLV. The extended TLV carries encryption metadata, and the encryption metadata is not encrypted.

The processing module is configured to:

obtain the encryption metadata from the extended TLV; and decrypt the encrypted field based on the encryption metadata.

In an embodiment, the unencrypted field includes the field indicating the index of the last SID in the SID list and a header extension length field.

The processing module is further configured to:

obtain the extended TLV based on the header extension length field and the field indicating the index of the last SID in the SID list.

In an embodiment, values of a type field of the extended TLV indicate locations of the encrypted field and the unencrypted field in the SRH.

The processing module is further configured to:

determine a location of the encrypted field in the SRH based on the type field of the extended TLV.

In an embodiment, the encrypted field further includes encrypted padding data, and the extended TLV further carries the encrypted padding data.

The processing module is configured to:

delete the padding data from a decrypted field to obtain the SRH that does not include an encrypted field.

In an embodiment, the extended TLV further carries an integrity check value.

The processing module is further configured to:

check integrity of the SID list and a field before the SID list in the SRH based on the integrity check value; and perform the operation of decrypting the encrypted field when the integrity of the SID list and the field before the SID list in the SRH is not damaged.

In conclusion, the embodiment of this application provides an SRH header encryption mechanism. The SRH header encryption mechanism encrypts at least the SID list. The SRH header encryption mechanism is established between the edge node and the POP node based on the internet. If the internet is used for transmission between POP nodes, the SRH header encryption mechanism is also established. If a private line network is used for transmission, SRH header encryption is not required. Based on this encryption mechanism, an SID list in an SRH of an SRv6 packet transmitted over the POP network is encrypted to protect the SID information in the SRH header from being leaked. In addition, end-to-end encryption of the POP network is implemented, and an intermediate POP node does not decrypt the payload, so that forwarding efficiency of the intermediate POP node is high. In addition, a secure check mechanism for a packet received by a POP node on the internet is further provided.

In some other embodiments, the processing module and the transceiver module in the network device shown in FIG. 14 have the following functions.

The transceiver module 1402 is configured to receive a first packet, where the first packet includes an encrypted part, a segment routing header SRH of the first packet is in the encrypted part, and a payload of the first packet is not in the encrypted part. For a specific implementation, refer to operation 1002 in the embodiment in FIG. 10.

The processing module 1401 is configured to decrypt the encrypted part to obtain the SRH. For a specific implementation, refer to operation 1003 in the embodiment in FIG. 10.

The processing module 1401 is further configured to process the first packet based on the SRH. For a specific implementation, refer to operation 1004 in the embodiment in FIG. 10.

In an embodiment, the processing module is configured to:

when determining, based on the SRH, that the network device is not a destination of the payload, modify the SRH based on a next hop of the payload, and generate a second packet based on a modified SRH, where the second packet includes the modified SRH and the payload.

In an embodiment, the processing module is configured to:

encrypt the modified SRH, where correspondingly, the second packet includes the encrypted part, and the encrypted modified SRH is in the encrypted part.

In an embodiment, the first packet includes an extension packet header, and the encrypted part is carried in the extension packet header.

The processing module is further configured to:

obtain the encrypted part from the extension packet header.

In an embodiment, the extension packet further carries encryption metadata.

The processing module is configured to:

decrypt the encrypted part based on the encryption metadata.

In an embodiment, the extension packet header further carries an integrity check value.

The processing module is configured to:

check integrity of the extension packet header based on the integrity check value; and perform the operation of decrypting the encrypted part when the integrity of the extension packet header is not damaged.

In an embodiment, the processing module is configured to:

when a value of the type field in the extension packet header is a first value, perform integrity check on the extension packet header and the IPv6 header of the first packet based on the integrity check value; or when the value of the type field of the extension packet header is a second value, perform integrity check on the extension packet header based on the integrity check value.

In an embodiment, the IPv6 header of the first packet is located at an outer layer of the extension packet header, and a next header field in the IPv6 header indicates that a next packet header is the extension packet header.

The processing module is configured to:

obtain the extension packet header based on the next header field in the IPv6 header.

In an embodiment, the encrypted part further includes encrypted padding data.

The processing module is configured to:

delete the padding data from a decrypted field to obtain the SRH.

In conclusion, the embodiment of this application provides an SRH header encryption mechanism. The SRH header encryption mechanism encrypts the entire SRH. The SRH header encryption mechanism is established between the edge node and the POP node based on the internet. If the internet is used for transmission between POP nodes, the SRH header encryption mechanism is also established. If a private line network is used for transmission, SRH header encryption is not required. Based on this encryption mechanism, an SRH in an SRv6 packet transmitted over the POP network is encrypted to protect SID information in the SRH header from being leaked. In addition, end-to-end encryption of the POP network is implemented, and an intermediate POP node does not decrypt the payload, so that forwarding efficiency of the intermediate POP node is high. In addition, a secure check mechanism for a packet received by a POP node on the internet is further provided.

It should be noted that when the network device provided in the foregoing embodiment sends a packet, division of the foregoing functional modules is merely used as an example for description. In actual application, the foregoing functions may be allocated to different functional modules for implementation based on a requirement, that is, an internal structure of the device is divided into different functional modules, so as to implement all or a part of the functions described above. In addition, the network device provided in the foregoing embodiment and the packet sending method embodiment belong to a same concept. For a specific implementation process of the network device, refer to the method embodiment. Details are not described herein again.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, or an optical disc.

The foregoing descriptions are merely embodiments provided in this application, but are not intended to limit embodiments of this application. Any modification, equivalent replacement, or improvement made without departing from the spirit and principle of the embodiments of this application shall fall within the protection scope of the embodiments of this application.

What is claimed is:

1. A packet sending method, comprising:
   sending, by a network device, a packet, wherein the packet comprises a segment routing header (SRH) and a payload, the SRH comprises an encrypted field and an unencrypted field, the encrypted field comprises at least an encrypted segment identifier (SID) list, and the SID list indicates a transmission path of the packet.

2. The method according to claim 1, wherein the unencrypted field comprises a field indicating an index of a last SID in the SID list.

3. The method according to claim 2, wherein the unencrypted field further comprises a routing type field.

4. The method according to claim 2, wherein the unencrypted field further comprises a reserved flags field, and a value of the reserved flags field indicates that the SID list has been encrypted.

5. The method according to claim 1, wherein the SRH comprises an extended type-length-value (TLV), the extended TLV carries encryption metadata, the encrypted field is encrypted based on the encryption metadata, and the encryption metadata is not encrypted.

6. The method according to claim 5, wherein the unencrypted field further comprises a header extension length field.

7. The method according to claim 5, wherein the extended TLV comprises an encryption flags field, and values of the encryption flags field indicate locations of the encrypted field and the unencrypted field in the SRH.

8. The method according to claim 5, wherein the encrypted field further comprises encrypted padding data, and the extended TLV further carries the encrypted padding data.

9. The method according to claim 5, wherein the extended TLV further carries an integrity check value, and the integrity check value is at least used to check integrity of the SID list and a field before the SID list in the SRH.

10. A packet sending method, comprising:
    receiving, by a network device, a first packet, wherein the first packet comprises a segment routing header (SRH) and a payload, the SRH comprises an encrypted field and an unencrypted field, the encrypted field comprises at least an encrypted segment identifier (SID) list, and the SID list indicates a transmission path of the first packet;
    decrypting, by the network device, the encrypted field to obtain an SRH that does not comprise an encrypted field; and
    processing, by the network device, the first packet based on the SRH that does not comprise an encrypted field.

11. The method according to claim 10, wherein the processing, by the network device, the first packet based on the SRH that does not comprise an encrypted field comprises:
    when the network device determines, based on the SRH that does not comprise an encrypted field, that the network device is not a destination of the payload, modifying, based on a next hop of the payload, the SRH that does not comprise an encrypted field, and generating a second packet based on a modified SRH, wherein the second packet comprises the modified SRH and the payload; and
    sending, by the network device, the second packet.

12. The method according to claim 11, further comprising:
    before the generating a second packet based on a modified SRH, encrypting the modified SRH, wherein correspondingly, the SRH in the second packet comprises the encrypted field and the unencrypted field.

13. The method according to claim 10, wherein the decrypting the encrypted field comprises:

determining, by the network device, an end location of the SID list based on a field that is in the SRH and that indicates an index of a last SID in the SID list, wherein the unencrypted field comprises the field indicating the index of the last SID in the SID list;

determining, by the network device, a start location of the SID list based on an IPv6 header of the first packet; and determining and obtaining, by the network device, the encrypted SID list based on the start location and the end location of the SID list, to decrypt the encrypted SID list.

14. The method according to claim 10, wherein the decrypting the encrypted field comprises:

determining, by the network device, an end location of the SID list based on a field that is in the SRH and that indicates a index of a last SID in the SID list, wherein the unencrypted field comprises the field indicating the index of the last SID in the SID list and a routing type field;

determining, by the network device, a start location of the SID list based on the routing type field; and determining and obtaining, by the network device, the encrypted SID list based on the start location and the end location of the SID list, to decrypt the encrypted SID list.

15. The method according to claim 10, the decrypting, by the network device, the encrypted field comprises:

when a value of a reserved flags field indicates that the SID list has been encrypted, performing an operation of decrypting the encrypted field, wherein the unencrypted field further comprises the reserved flags field.

16. A network device, comprising:

a memory, storing instructions; and a processor connected to the memory, wherein when the instructions are executed by the processor, the network device is configured to:

encrypt a segment routing header (SRH) in a packet, wherein the packet further comprises a payload, the encrypted SRH comprises an encrypted field and an unencrypted field, the encrypted field comprises at least an encrypted segment identifier (SID) list, and the SID list indicates a transmission path of the packet; and send the packet.

17. The network device according to claim 16, wherein the unencrypted field comprises a field indicating an index of a last SID in the SID list.

18. The network device according to claim 17, wherein the unencrypted field further comprises a routing type field.

19. The network device according to claim 17, wherein the unencrypted field further comprises a reserved flags field, and a value of the reserved flags field indicates that the SID list has been encrypted.

20. The network device according to claim 16, wherein the SRH comprises an extended type-length-value (TLV), the extended TLV carries encryption metadata, the encrypted field is encrypted based on the encryption metadata, and the encryption metadata is not encrypted.

\* \* \* \* \*